United States Patent
Yang et al.

(10) Patent No.: US 10,764,000 B2
(45) Date of Patent: Sep. 1, 2020

(54) METHOD AND APPARATUS FOR TRANSMITTING AND RECEIVING WIRELESS SIGNAL IN WIRELESS COMMUNICATION SYSTEM

(71) Applicant: LG Electronics Inc., Seoul (KR)

(72) Inventors: Suckchel Yang, Seoul (KR); Byounghoon Kim, Seoul (KR); Kijun Kim, Seoul (KR); Joonkui Ahn, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/300,489

(22) PCT Filed: May 10, 2017

(86) PCT No.: PCT/KR2017/004831
§ 371 (c)(1),
(2) Date: Nov. 13, 2018

(87) PCT Pub. No.: WO2017/196079
PCT Pub. Date: Nov. 16, 2017

(65) Prior Publication Data
US 2019/0288801 A1    Sep. 19, 2019

Related U.S. Application Data

(60) Provisional application No. 62/382,770, filed on Sep. 1, 2016, provisional application No. 62/353,111, filed
(Continued)

(51) Int. Cl.
*H04L 1/18* (2006.01)
*H04L 1/00* (2006.01)
(Continued)

(52) U.S. Cl.
CPC .......... *H04L 1/1854* (2013.01); *H04L 1/0038* (2013.01); *H04L 1/18* (2013.01); *H04L 5/0055* (2013.01); *H04W 72/0446* (2013.01)

(58) Field of Classification Search
CPC ... H04L 1/1812; H04L 1/1825; H04L 1/1854; H04L 1/1861; H04L 1/1887;
(Continued)

(56) References Cited

U.S. PATENT DOCUMENTS

2016/0100395 A1    4/2016  Xu et al.
2016/0352551 A1*  12/2016  Zhang .................. H04L 5/0007

FOREIGN PATENT DOCUMENTS

WO    WO2016064048    4/2016

OTHER PUBLICATIONS

Huawei, HiSilicon, "PDCCH design for short TTI," R1-162109, 3GPP TSG RAN WG1 Meeting #84bis, Busan, Korea Apr. 11-15, 2016, 4 pages.
(Continued)

*Primary Examiner* — Pao Sinkantarakorn
(74) *Attorney, Agent, or Firm* — Fish & Richardson P.C.

(57) ABSTRACT

The present invention relates to a wireless communication system and, particularly, to a method and an apparatus therefor, the method comprising the steps of: receiving data during a first TTI; transmitting a NACK for the data; and receiving a retransmission signal of the data during a second TTI, wherein a time interval between the first TTI and the second TTI changes according to a TTI length.

16 Claims, 17 Drawing Sheets

Related U.S. Application Data on Jun. 22, 2016, provisional application No. 62/338,520, filed on May 19, 2016, provisional application No. 62/335,715, filed on May 13, 2016, provisional application No. 62/334,436, filed on May 10, 2016.

(51) Int. Cl.
*H04L 5/00* (2006.01)
*H04W 72/04* (2009.01)

(58) Field of Classification Search
CPC ... H04L 1/1893; H04L 5/0055; H04L 5/0078; H04L 5/0082; H04L 5/0087; H04L 27/2602; H04L 27/2646
See application file for complete search history.

(56) References Cited

OTHER PUBLICATIONS

ZTE, "Processing time reduction and related procedures," R1-162408, 3GPP TSG RAN WG1 Meeting #84bis, Busan, Korea, Apr. 11-15, 2016, 4 pages.
ETRI, "Scalable TTI for new radio frame structure," R1-162569, 3GPP TSG RAN WG1 Meeting #84bis, Busan, Korea, Apr. 11-15, 2016, 5 pages.
PCT International Search Report in International Appln. No. PCT/KR2017/004831, dated Jul. 27, 2017, 19 pages.

* cited by examiner

HARQ processes in UL-DL configuration #1

PUSCH-PHICH/UL grant timing (UL-DL configuration #1)

HARQ processes in UL-DL configuration #1

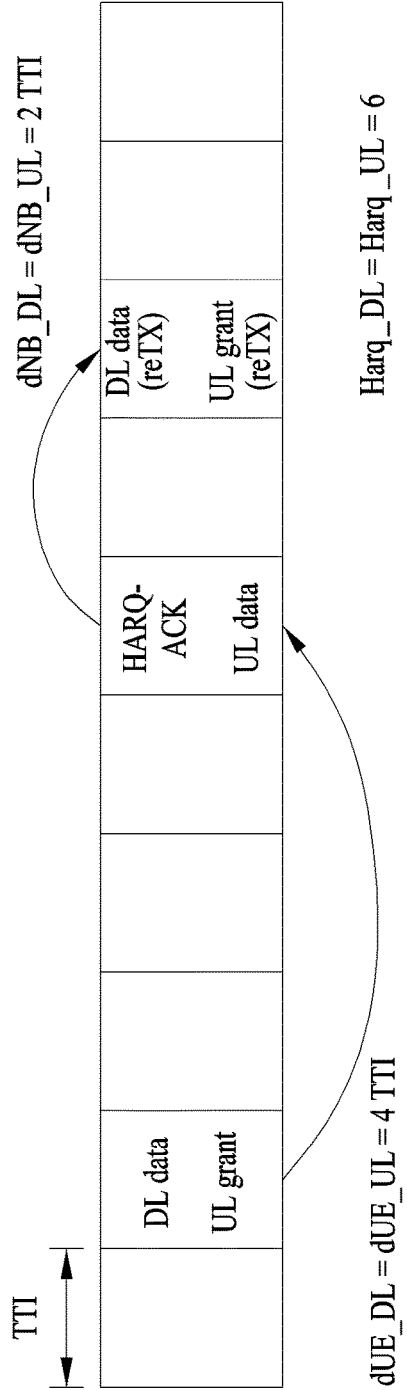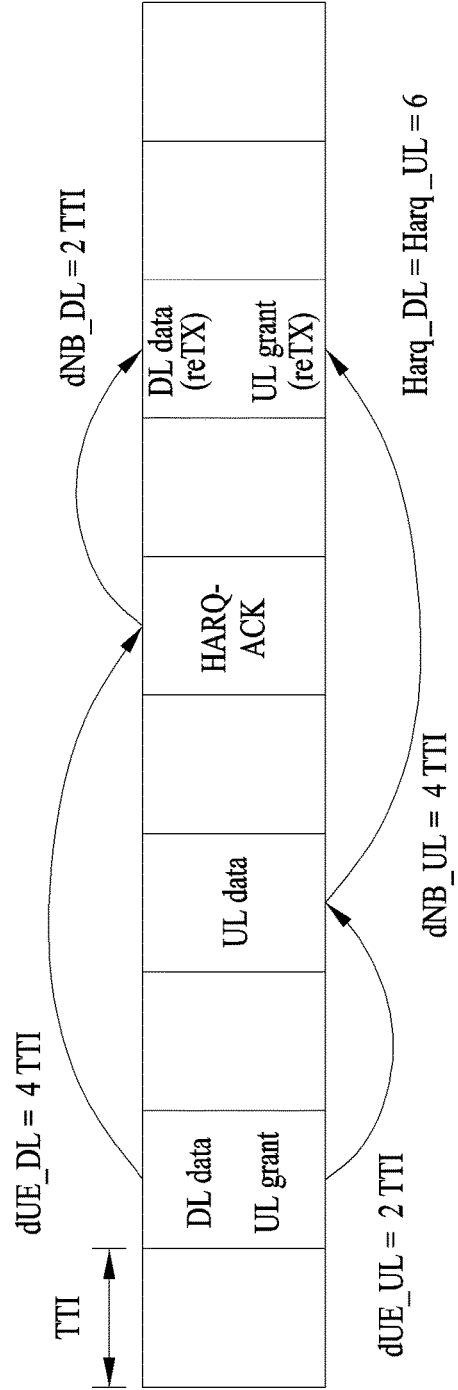

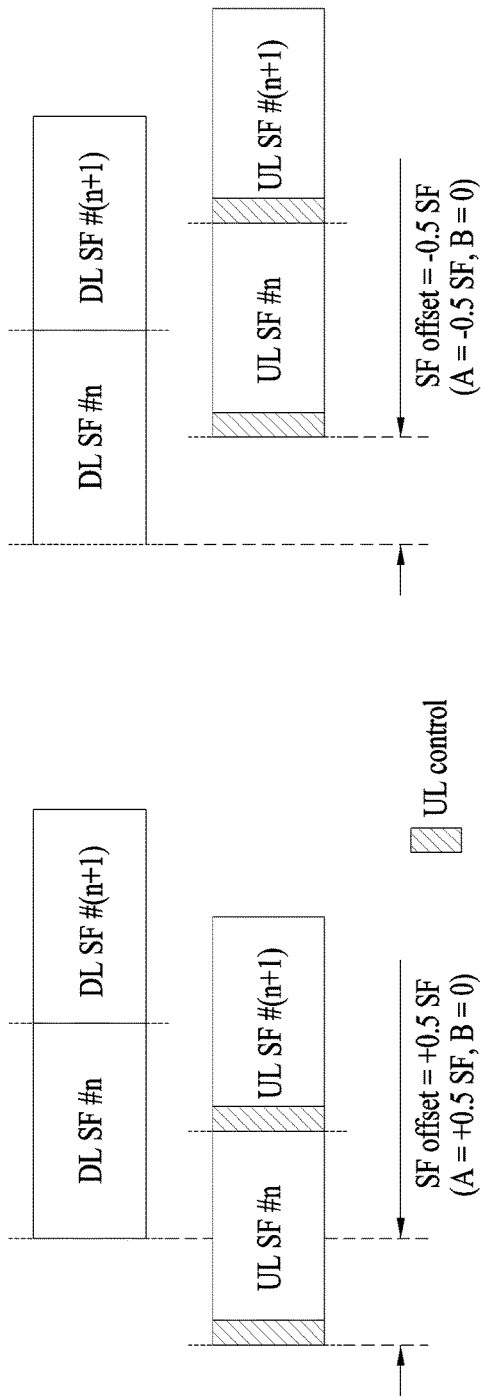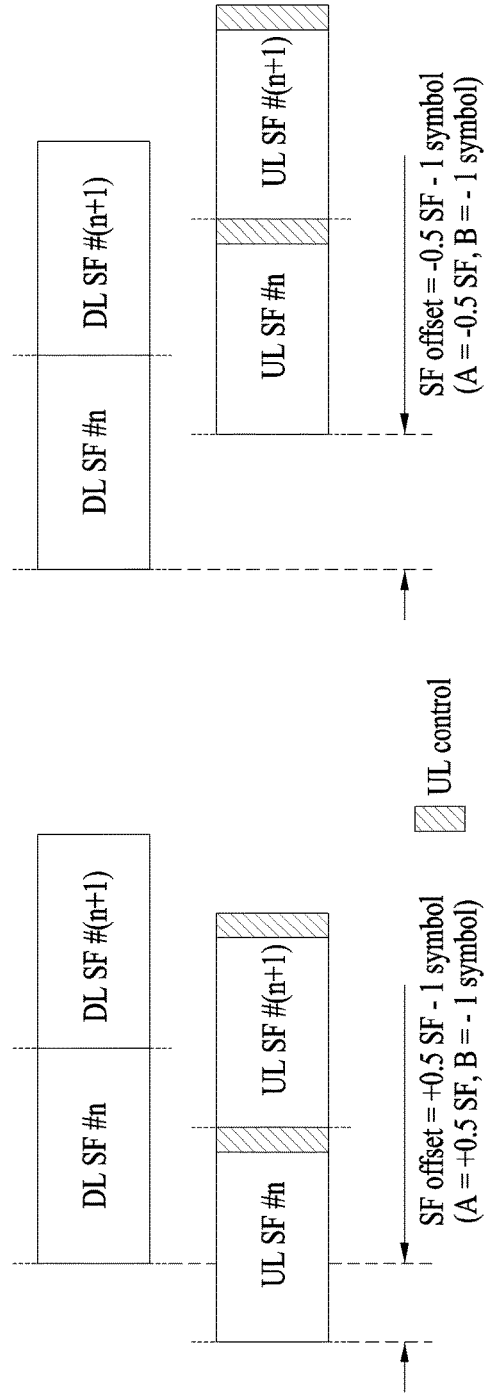

METHOD AND APPARATUS FOR TRANSMITTING AND RECEIVING WIRELESS SIGNAL IN WIRELESS COMMUNICATION SYSTEM

CROSS-REFERENCE TO RELATED APPLICATIONS

This application is a National Stage application under 35 U.S.C. § 371 of International Application No. PCT/KR2017/004831, filed on May 10, 2017, which claims the benefit of U.S. Provisional Application No. 62/382,770, filed on Sep. 1, 2016, U.S. Provisional Application No. 62/353,111, filed on Jun. 22, 2016, U.S. Provisional Application No. 62/338,520, filed on May 19, 2016, U.S. Provisional Application No. 62/335,715, filed on May 13, 2016, and U.S. Provisional Application No. 62/334,436, filed on May 10, 2016. The disclosures of the prior applications are incorporated by reference in their entirety.

TECHNICAL FIELD

The present invention relates to a wireless communication system, and more particularly, to a method and apparatus for transmitting/receiving a wireless signal. The wireless communication system includes a CA-based (Carrier Aggregation-based) wireless communication system.

BACKGROUND ART

Wireless communication systems have been widely deployed to provide various types of communication services including voice and data services. In general, a wireless communication system is a multiple access system that supports communication among multiple users by sharing available system resources (e.g. bandwidth, transmit power, etc.) among the multiple users. The multiple access system may adopt a multiple access scheme such as code division multiple access (CDMA), frequency division multiple access (FDMA), time division multiple access (TDMA), orthogonal frequency division multiple access (OFDMA), or single carrier frequency division multiple access (SC-FDMA).

DISCLOSURE

Technical Problem

It is an object of the present invention to provide a method and apparatus for efficiently performing operations of transmission and reception of a wireless signal.

Technical tasks obtainable from the present invention are non-limited by the above-mentioned technical task. And, other unmentioned technical tasks can be clearly understood from the following description by those having ordinary skill in the technical field to which the present invention pertains.

Technical Solution

In an aspect of the present invention, a method of receiving a downlink signal by a terminal in a wireless communication system includes: receiving data during a first transmission time interval (TTI); transmitting a negative acknowledgement (NACK) for the data; and receiving a retransmission signal of the data during a second TTI. A time interval between the first TTI and the second TTI is changed according to a TTI length.

In another aspect of the present invention, a terminal used in a wireless communication system includes: a radio frequency (RF) module; and a processor. The processor is configured to receive data during a first transmission time interval (TTI), to transmit a negative acknowledgement (NACK) for the data, and to receive a retransmission signal of the data during a second TTI. A time interval between the first TTI and the second TTI is changed according to a TTI length.

Preferably, as the TTI length increases, the time interval between the first TTI and the second TTI may increase, and as the TTI length decreases, the time interval between the first TTI and the second TTI may decrease.

Preferably, the method may further include blind-decoding a plurality of control channel candidates to receive a control channel scheduling the data during the first TTI, and the number of blind decodings during the first TTI may be changed according to the TTI length.

Preferably, as the TTI length increases, the number of blind decodings during the first TTI may increase, and as the TTI length decreases, the number of blind decodings during the first TTI may decrease.

Preferably, if the TTI length is larger than a reference value, the data may be mapped to time-frequency resources in a time-first manner, and if the TTI length is less than the reference value, the data may be mapped to time-frequency resources in a frequency-first manner.

Preferably, the TTI length may be set according to a service type provided to the terminal in the order of ultra-reliable and low latency communications (URLLC)<enhanced mobile broadband (eMBB)<massive machine type communications (mMTC).

Preferably, the wireless communication system may include a $3^{rd}$ generation partnership project long term evolution (3GPP LTE)-based wireless communication system, and the TTI length may be an integer multiple of a subframe or a slot.

Advantageous Effects

According to embodiments of the present invention, wireless signal transmission and reception can be efficiently performed in a wireless communication system.

Effects obtainable from the present invention are non-limited by the above mentioned effect. And, other unmentioned effects can be clearly understood from the following description by those having ordinary skill in the technical field to which the present invention pertains.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

FIGS. 18 to 23 illustrate a signal transmission procedure according to the present invention.

BEST MODE FOR CARRYING OUT THE INVENTION

Embodiments of the present invention are applicable to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, and Evolved UTRA (E-UTRA). UTRA is a part of Universal Mobile Telecommunications System (UMTS). 3rd Generation Partnership Project (3GPP) Long Term Evolution (LTE) is a part of Evolved UMTS (E-UMTS) using E-UTRA, employing OFDMA for downlink and SC-FDMA for uplink. LTE-Advanced (LTE-A) evolves from 3GPP LTE.

While the following description is given, centering on 3GPP LTE/LTE-A for clarity, this is purely exemplary and thus should not be construed as limiting the present invention. It should be noted that specific terms disclosed in the present invention are proposed for convenience of description and better understanding of the present invention, and the use of these specific terms may be changed to other formats within the technical scope or spirit of the present invention.

Figure 1:
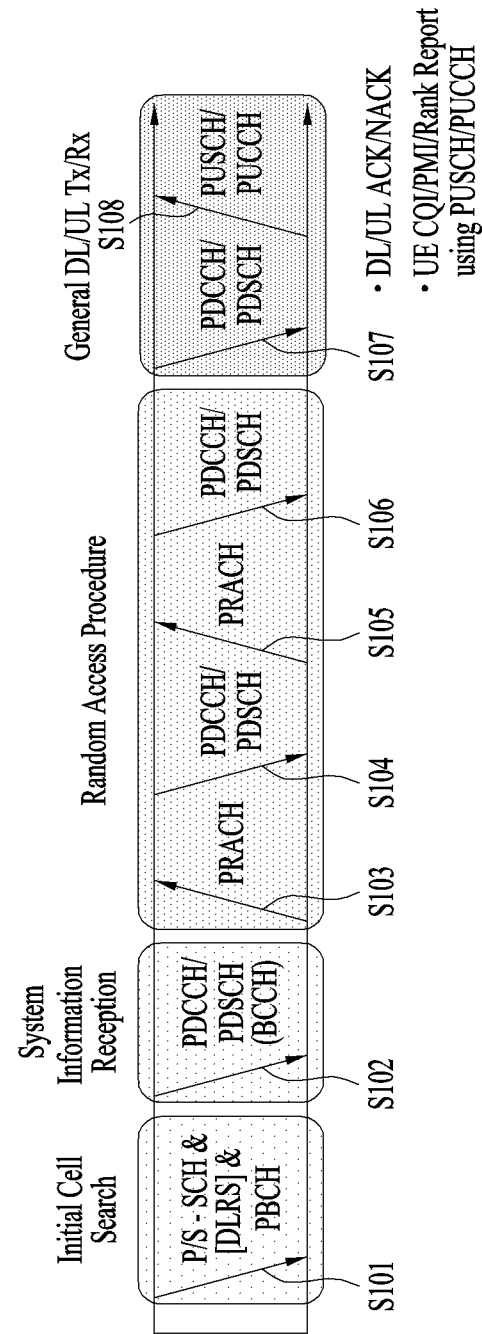
FIG. 1 illustrates physical channels used in 3GPP LTE(-A) and a signal transmission method using the same.

FIG. 1 illustrates physical channels used in 3GPP LTE(-A) and a signal transmission method using the same.

When powered on or when a UE initially enters a cell, the UE performs initial cell search involving synchronization with a BS in step S101. For initial cell search, the UE synchronizes with the BS and acquire information such as a cell Identifier (ID) by receiving a primary synchronization channel (P-SCH) and a secondary synchronization channel (S-SCH) from the BS. Then the UE may receive broadcast information from the cell on a physical broadcast channel (PBCH). In the meantime, the UE may check a downlink channel status by receiving a downlink reference signal (DL RS) during initial cell search.

After initial cell search, the UE may acquire more specific system information by receiving a physical downlink control channel (PDCCH) and receiving a physical downlink shared channel (PDSCH) based on information of the PDCCH in step S102.

The UE may perform a random access procedure to access the BS in steps S103 to S106. For random access, the UE may transmit a preamble to the BS on a physical random access channel (PRACH) (S103) and receive a response message for preamble on a PDCCH and a PDSCH corresponding to the PDCCH (S104). In the case of contention-based random access, the UE may perform a contention resolution procedure by further transmitting the PRACH (S105) and receiving a PDCCH and a PDSCH corresponding to the PDCCH (S106).

After the foregoing procedure, the UE may receive a PDCCH/PDSCH (S107) and transmit a physical uplink shared channel (PUSCH)/physical uplink control channel (PUCCH) (S108), as a general downlink/uplink signal transmission procedure. Control information transmitted from the UE to the BS is referred to as uplink control information (UCI). The UCI includes hybrid automatic repeat and request acknowledgement/negative-acknowledgement (HARQ-ACK/NACK), scheduling request (SR), channel state information (CSI), etc. The CSI includes a channel quality indicator (CQI), a precoding matrix indicator (PMI), a rank indicator (RI), etc. While the UCI is transmitted on a PUCCH in general, the UCI may be transmitted on a PUSCH when control information and traffic data need to be simultaneously transmitted. In addition, the UCI may be aperiodically transmitted through a PUSCH according to request/command of a network.

Figure 2:
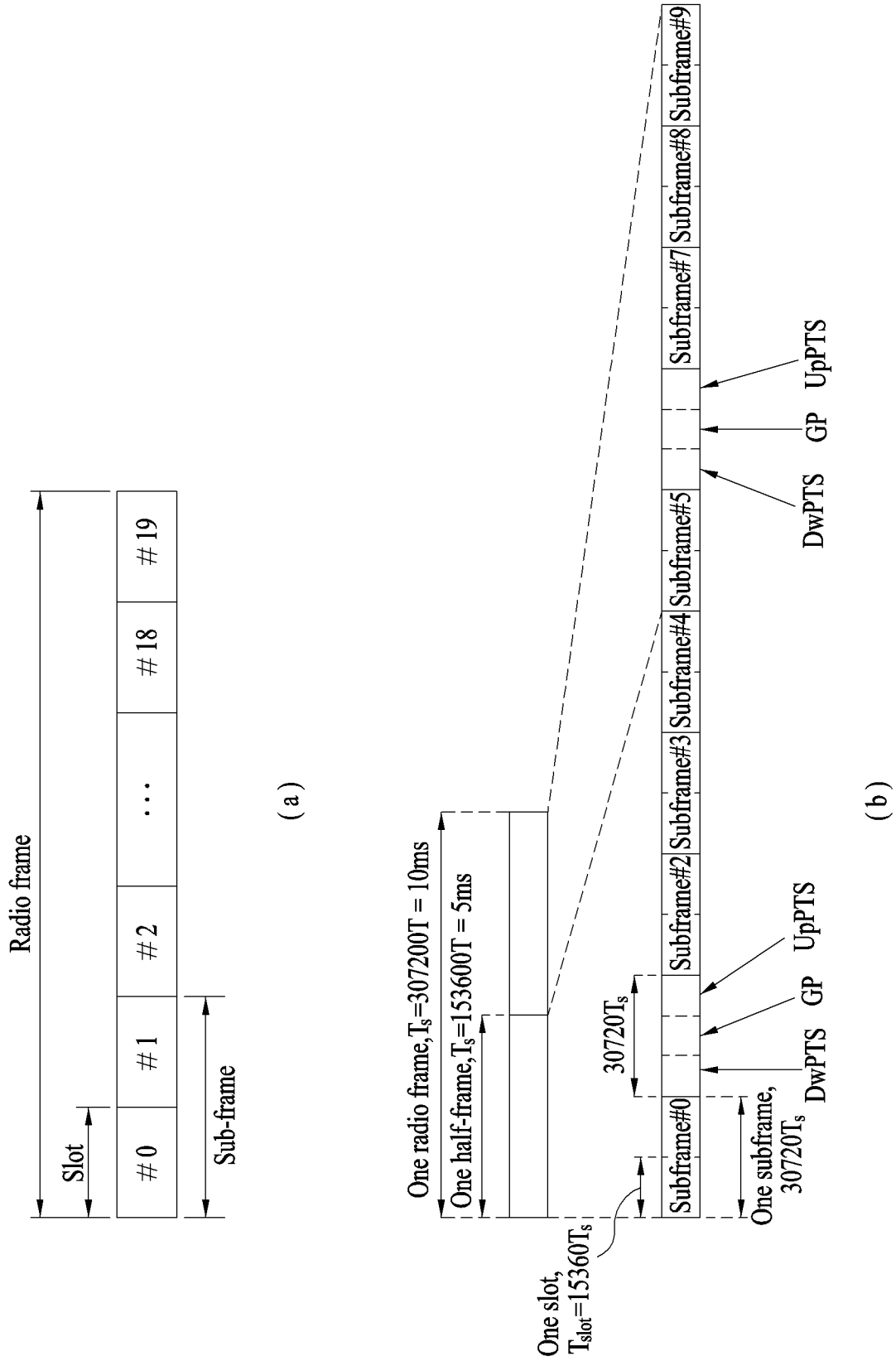
FIG. 2 illustrates a radio frame structure.

FIG. 2 illustrates a radio frame structure. Uplink/downlink data packet transmission is performed on a subframe-by-subframe basis. A subframe is defined as a predetermined time interval including a plurality of symbols. 3GPP LTE supports a type-1 radio frame structure applicable to frequency division duplex (FDD) and a type-2 radio frame structure applicable to time division duplex (TDD).

FIG. 2(*a*) illustrates a type-1 radio frame structure. A downlink subframe includes 10 subframes each of which includes 2 slots in the time domain. A time for transmitting a subframe is defined as a transmission time interval (TTI). For example, each subframe has a duration of 1 ms and each slot has a duration of 0.5 ms. A slot includes a plurality of OFDM symbols in the time domain and includes a plurality of resource blocks (RBs) in the frequency domain. Since downlink uses OFDM in 3GPP LTE, an OFDM symbol represents a symbol period. The OFDM symbol may be called an SC-FDMA symbol or symbol period. An RB as a resource allocation unit may include a plurality of consecutive subcarriers in one slot.

The number of OFDM symbols included in one slot may depend on cyclic prefix (CP) configuration. CPs include an extended CP and a normal CP. When an OFDM symbol is configured with the normal CP, for example, the number of OFDM symbols included in one slot may be 7. When an OFDM symbol is configured with the extended CP, the length of one OFDM symbol increases, and thus the number of OFDM symbols included in one slot is smaller than that in case of the normal CP. In case of the extended CP, the number of OFDM symbols allocated to one slot may be 6. When a channel state is unstable, such as a case in which a UE moves at a high speed, the extended CP can be used to reduce inter-symbol interference.

When the normal CP is used, one subframe includes 14 OFDM symbols since one slot has 7 OFDM symbols. The first three OFDM symbols at most in each subframe can be allocated to a PDCCH and the remaining OFDM symbols can be allocated to a PDSCH.

FIG. 2(b) illustrates a type-2 radio frame structure. The type-2 radio frame includes 2 half frames. Each half frame includes 4(5) normal subframes and 10 special subframes. The normal subframes are used for uplink or downlink according to UL-DL configuration. A subframe is composed of 2 slots.

Table 1 shows subframe configurations in a radio frame according to UL-DL configurations.

TABLE 1

| Uplink-downlink configuration | Downlink-to-Uplink Switch point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes DwPTS (Downlink Pilot TimeSlot), GP (Guard Period), and UpPTS (Uplink Pilot TimeSlot). DwPTS is used for initial cell search, synchronization or channel estimation in a UE and UpPTS is used for channel estimation in a BS and uplink transmission synchronization in a UE. The GP eliminates UL interference caused by multi-path delay of a DL signal between a UL and a DL.

The radio frame structure is merely exemplary and the number of subframes included in the radio frame, the number of slots included in a subframe, and the number of symbols included in a slot can be vary.

Figure 3:
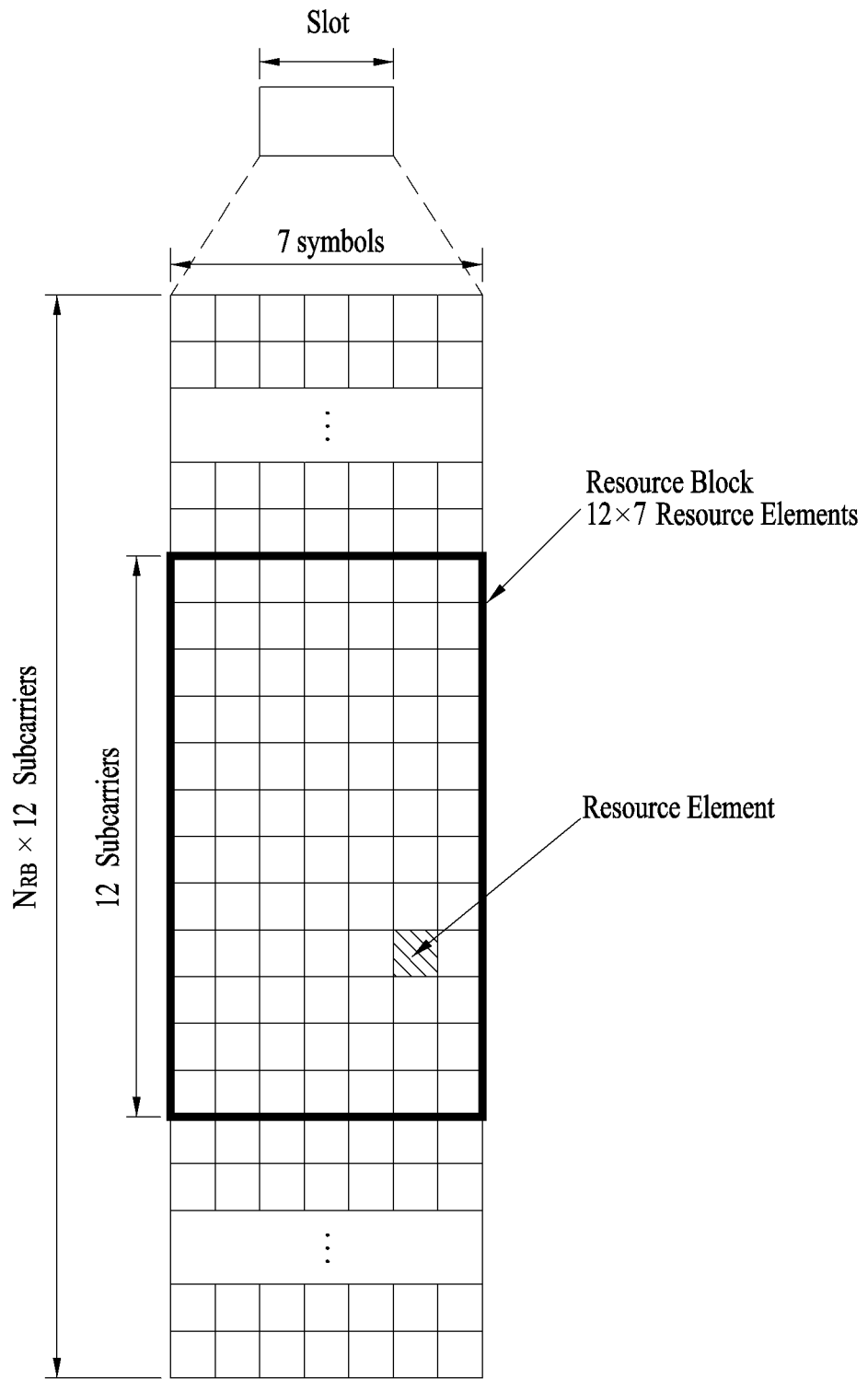
FIG. 3 illustrates a resource grid of a downlink slot.

FIG. 3 illustrates a resource grid of a downlink slot.

Referring to FIG. 3, a downlink slot includes a plurality of OFDM symbols in the time domain. While one downlink slot may include 7 OFDM symbols and one resource block (RB) may include 12 subcarriers in the frequency domain in the figure, the present invention is not limited thereto. Each element on the resource grid is referred to as a resource element (RE). One RB includes 12×7 REs. The number NRB of RBs included in the downlink slot depends on a downlink transmit bandwidth. The structure of an uplink slot may be same as that of the downlink slot.

Figure 4:
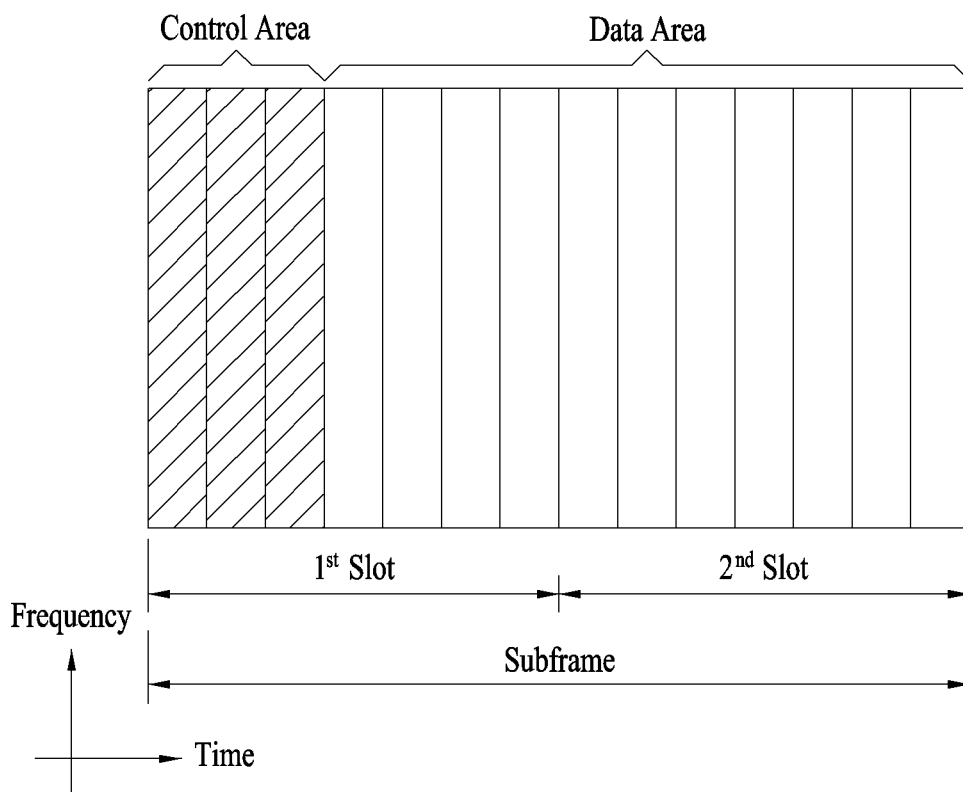
FIG. 4 illustrates a downlink subframe structure.

FIG. 4 illustrates a downlink subframe structure.

Referring to FIG. 4, a maximum of three (four) OFDM symbols located in a front portion of a first slot within a subframe correspond to a control region to which a control channel is allocated. The remaining OFDM symbols correspond to a data region to which a physical downlink shared channel (PDSCH) is allocated. A basic resource unit of the data region is an RB. Examples of downlink control channels used in LTE include a physical control format indicator channel (PCFICH), a physical downlink control channel (PDCCH), a physical hybrid ARQ indicator channel (PH-ICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative-acknowledgment (NACK) signal. Control information transmitted through the PDCCH is referred to as downlink control information (DCI). The DCI includes uplink or downlink scheduling information or an uplink transmit power control command for an arbitrary UE group.

Control information transmitted through the PDCCH is referred to as downlink control information (DCI). Formats 0, 3, 3A and 4 for uplink and formats 1, 1A, 1B, 1C, 1D, 2, 2A, 2B and 2C for downlink are defined as DCI formats. Information field type, the number of information fields, the number of bits of each information field, etc. depend on DIC format. For example, the DCI formats selectively include information such as hopping flag, RB assignment, MCS (Modulation Coding Scheme), RV (Redundancy Version), NDI (New Data Indicator), TPC (Transmit Power Control), HARQ process number, PMI (Precoding Matrix Indicator) confirmation as necessary. Accordingly, the size of control information matched to a DCI format depends on the DCI format. A arbitrary DCI format may be used to transmit two or more types of control information. For example, DIC formats 0/1A is used to carry DCI format 0 or DIC format 1, which are discriminated from each other using a flag field.

A PDCCH may carry a transport format and a resource allocation of a downlink shared channel (DL-SCH), resource allocation information of an uplink shared channel (UL-SCH), paging information on a paging channel (PCH), system information on the DL-SCH, information on resource allocation of an upper-layer control message such as a random access response transmitted on the PDSCH, a set of Tx power control commands on individual UEs within an arbitrary UE group, a Tx power control command, information on activation of a voice over IP (VoIP), etc. A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). A format of the PDCCH and the number of bits of the available PDCCH are determined by the number of CCEs. The BS determines a PDCCH format according to DCI to be transmitted to the UE, and attaches a cyclic redundancy check (CRC) to control information. The CRC is masked with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be masked to the CRC. Alternatively, if the PDCCH is for a paging message, a paging identifier (e.g., paging-RNTI (P-RNTI)) may be masked to the CRC. If the PDCCH is for system information (more specifically, a system information block (SIB)), a system information RNTI (SI-RNTI) may be masked to the CRC. When the PDCCH is for a random access response, a random access-RNTI (RA-RNTI) may be masked to the CRC.

The PDCCH carries a message known as DCI which includes resource assignment information and other control information for a UE or UE group. In general, a plurality of PDCCHs can be transmitted in a subframe. Each PDCCH is transmitted using one or more CCEs. Each CCE corresponds to 9 sets of 4 REs. The 4 REs are referred to as an REG. 4

QPSK symbols are mapped to one REG. REs allocated to a reference signal are not included in an REG, and thus the total number of REGs in OFDM symbols depends on presence or absence of a cell-specific reference signal. The concept of REG (i.e. group based mapping, each group including 4 REs) is used for other downlink control channels (PCFICH and PHICH). That is, REG is used as a basic resource unit of a control region. 4 PDCCH formats are supported as shown in Table 2.

TABLE 2

| PDCCH format | Number of CCEs (n) | Number of REGs | Number of PDCCH bits |
|---|---|---|---|
| 0 | 1 | 9 | 72 |
| 1 | 2 | 8 | 144 |
| 2 | 4 | 36 | 288 |
| 3 | 5 | 72 | 576 |

CCEs are sequentially numbered. To simplify a decoding process, transmission of a PDCCH having a format including n CCEs can be started using as many CCEs as a multiple of n. The number of CCEs used to transmit a specific PDCCH is determined by a BS according to channel condition. For example, if a PDCCH is for a UE having a high-quality downlink channel (e.g. a channel close to the BS), only one CCE can be used for PDCCH transmission. However, for a UE having a poor channel (e.g. a channel close to a cell edge), 8 CCEs can be used for PDCCH transmission in order to obtain sufficient robustness. In addition, a power level of the PDCCH can be controlled according to channel condition.

LTE defines CCE positions in a limited set in which PDCCHs can be positioned for each UE. CCE positions in a limited set that the UE needs to monitor in order to detect the PDCCH allocated thereto may be referred to as a search space (SS). In LTE, the SS has a size depending on PDCCH format. A UE-specific search space (USS) and a common search space (CSS) are separately defined. The USS is set per UE and the range of the CSS is signaled to all UEs. The USS and the CSS may overlap for a given UE. In the case of a considerably small SS with respect to a specific UE, when some CCEs positions are allocated in the SS, remaining CCEs are not present. Accordingly, the BS may not find CCE resources on which PDCCHs will be transmitted to available UEs within given subframes. To minimize the possibility that this blocking continues to the next subframe, a UE-specific hopping sequence is applied to the starting point of the USS.

Table 3 shows sizes of the CSS and USS.

TABLE 3

| PDCCH format | Number of CCEs (n) | Number of candidates in common search space | Number of candidates in dedicated search space |
|---|---|---|---|
| 0 | 1 | — | 6 |
| 1 | 2 | — | 6 |
| 2 | 4 | 4 | 2 |
| 3 | 8 | 2 | 2 |

To control computational load of blind decoding based on the number of blind decoding processes to an appropriate level, the UE is not required to simultaneously search for all defined DCI formats. In general, the UE searches for formats 0 and 1A at all times in the USS. Formats 0 and 1A have the same size and are discriminated from each other by a flag in a message. The UE may need to receive an additional format (e.g. format 1, 1B or 2 according to PDSCH transmission mode set by a BS). The UE searches for formats 1A and 1C in the CSS. Furthermore, the UE may be set to search for format 3 or 3A. Formats 3 and 3A have the same size as that of formats 0 and 1A and may be discriminated from each other by scrambling CRC with different (common) identifiers rather than a UE-specific identifier. PDSCH transmission schemes and information content of DCI formats according to transmission mode (TM) are arranged below.

Figure 5:
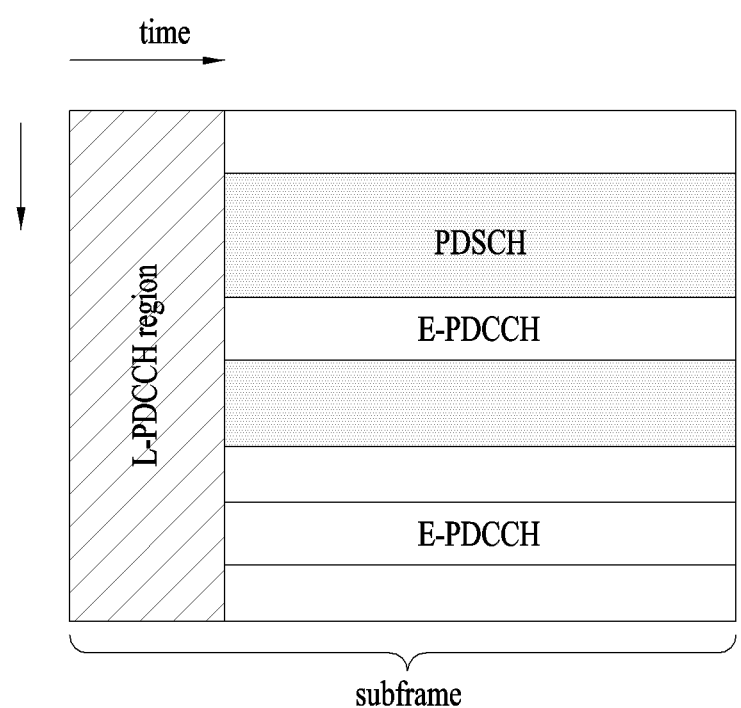
FIG. 5 illustrates an example of Enhanced Physical Downlink Control Channel (EPDCCH).

Transmission Mode (TM)
  Transmission mode 1: Transmission from a single base station antenna port
  Transmission mode 2: Transmit diversity
  Transmission mode 3: Open-loop spatial multiplexing
  Transmission mode 4: Closed-loop spatial multiplexing
  Transmission mode 5: Multi-user MIMO (Multiple Input Multiple Output)
  Transmission mode 6: Closed-loop rank-1 precoding
  Transmission mode 7: Single-antenna port (port5) transmission
  Transmission mode 8: Double layer transmission (ports 7 and 8) or single-antenna port (port 7 or 8) transmission
  Transmission mode 9: Transmission through up to 8 layers (ports 7 to 14) or single-antenna port (port 7 or 8) transmission DCI Format
  Format 0: Resource grants for PUSCH transmission
  Format 1: Resource assignments for single codeword PDSCH transmission (transmission modes 1, 2 and 7)
  Format 1A: Compact signaling of resource assignments for single codeword PDSCH (all modes)
  Format 1B: Compact resource assignments for PDSCH using rank-1 closed loop precoding (mod 6)
  Format 1C: Very compact resource assignments for PDSCH (e.g. paging/broadcast system information)
  Format 1D: Compact resource assignments for PDSCH using multi-user MIMO (mode 5)
  Format 2: Resource assignments for PDSCH for closed-loop MIMO operation (mode 4)
  Format 2A: Resource assignments for PDSCH for open-loop MIMO operation (mode 3)
  Format 3/3A: Power control commands for PUCCH and PUSCH with 2-bit/1-bit power adjustments FIG. 5 illustrates an EPDCCH. The EPDCCH is a channel additionally introduced in LTE-A.

Referring to FIG. 5, a PDCCH (for convenience, legacy PDCCH or L-PDCCH) according to legacy LTE may be allocated to a control region (see FIG. 4) of a subframe. In the figure, the L-PDCCH region means a region to which a legacy PDCCH may be allocated. Meanwhile, a PDCCH may be further allocated to the data region (e.g., a resource region for a PDSCH). A PDCCH allocated to the data region is referred to as an E-PDCCH. As shown, control channel resources may be further acquired via the E-PDCCH to mitigate a scheduling restriction due to restricted control channel resources of the L-PDCCH region. Similarly to the L-PDCCH, the E-PDCCH carries DCI. For example, the E-PDCCH may carry downlink scheduling information and uplink scheduling information. For example, the UE may receive the E-PDCCH and receive data/control information via a PDSCH corresponding to the E-PDCCH. In addition, the UE may receive the E-PDCCH and transmit data/control information via a PUSCH corresponding to the E-PDCCH. The E-PDCCH/PDSCH may be allocated starting from a first OFDM symbol of the subframe, according to cell type.

In this specification, the PDCCH includes both L-PDCCH and EPDCCH unless otherwise noted.

Figure 6:
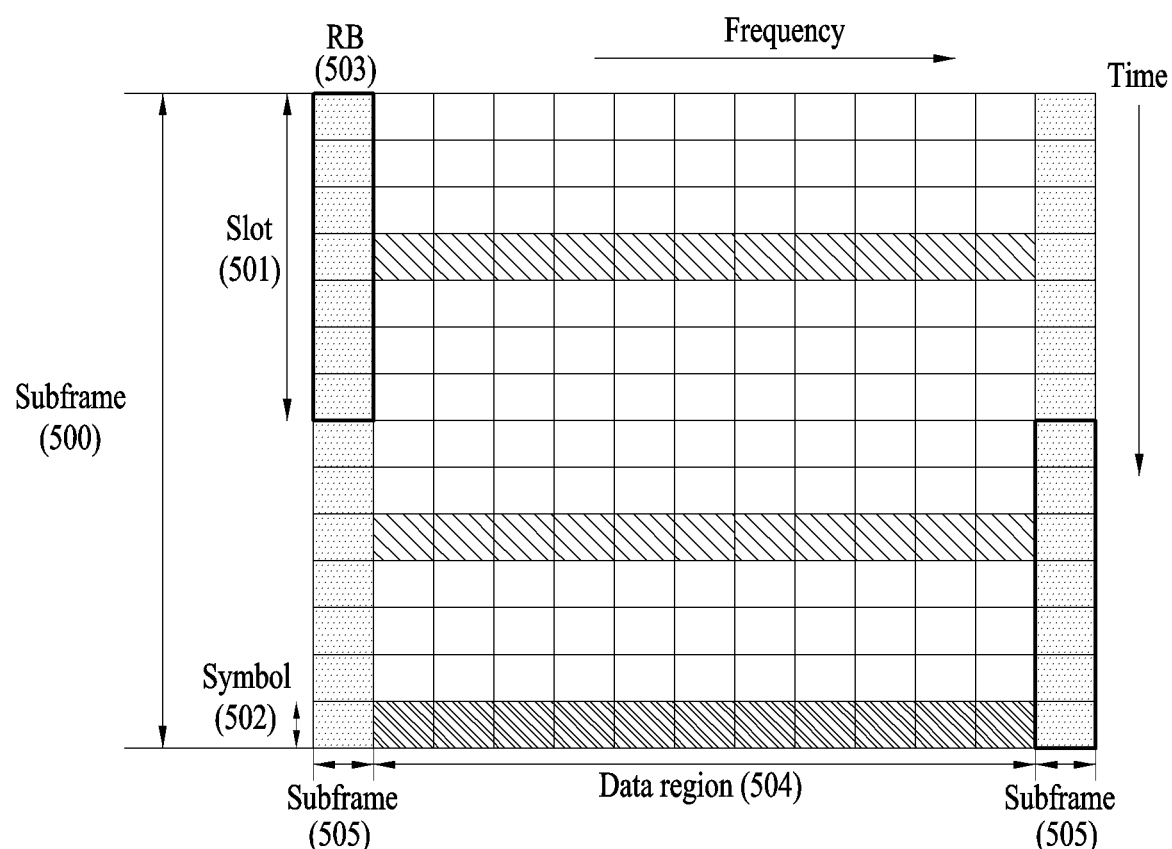
FIG. 6 illustrates the structure of an uplink subframe used in LTE(-A).

FIG. 6 illustrates a structure of an uplink subframe used in LTE(-A).

Referring to FIG. 6, a subframe 500 is composed of two 0.5 ms slots 501. Assuming a length of a normal cyclic prefix (CP), each slot is composed of 7 symbols 502 and one symbol corresponds to one SC-FDMA symbol. A resource block (RB) 503 is a resource allocation unit corresponding to 12 subcarriers in the frequency domain and one slot in the time domain. The structure of the uplink subframe of LTE(-A) is largely divided into a data region 504 and a control region 505. A data region refers to a communication resource used for transmission of data such as voice, a packet, etc. transmitted to each UE and includes a physical uplink shared channel (PUSCH). A control region refers to a communication resource for transmission of an uplink control signal, for example, downlink channel quality report from each UE, reception ACK/NACK for a downlink signal, uplink scheduling request, etc. and includes a physical uplink control channel (PUCCH). A sounding reference signal (SRS) is transmitted through an SC-FDMA symbol that is lastly positioned in the time axis in one subframe. SRSs of a plurality of UEs, which are transmitted to the last SC-FDMAs of the same subframe, can be differentiated according to frequency positions/sequences. The SRS is used to transmit an uplink channel state to an eNB and is periodically transmitted according to a subframe period/offset set by a higher layer (e.g., RRC layer) or aperiodically transmitted at the request of the eNB.

Next, HARQ (Hybrid Automatic Repeat reQuest) will be described. When there are a plurality of UEs having data to be transmitted on uplink/downlink in a wireless communication, an eNB selects UEs which will transmit data per transmission time internal (TTI) (e.g., subframe). In a system using multiple carriers and the like, an eNB selects UEs which will transmit data on uplink/downlink per TTI and also selects a frequency band to be used for data transmission of the corresponding UEs.

When description is based on uplink (UL), UEs transmit reference signals (or pilot signals) on uplink and an eNB detects channel states of the UEs using the reference signals transmitted from the UEs and selects UEs which will transmit data on uplink in each unit frequency band per TTI. The eNB notifies the UEs of the result of selection. That is, the eNB transmits, to UL scheduled UEs, a UL assignment message indicating that the UEs may transmit data using a specific frequency band in a specific TTI. The UL assignment message is also referred to as a UL grant. The UEs transmit data on uplink according to the UL assignment message. The UL assignment message may include UE identity (ID), RB allocation information, a modulation and coding scheme (MCS), a redundancy version (RV), new data indication (NDI) and the like.

In the case of synchronous HARQ, a retransmission time is appointed in the system (e.g., after 4 subframes from a NACK reception time) (synchronous HARQ). Accordingly, the eNB may send a UL grant message to UEs only in initial transmission and subsequent retransmission is performed according to an ACK/NACK signal (e.g., PHICH signal). In the case of asynchronous HARQ, a retransmission time is not appointed and thus the eNB needs to send a retransmission request message to UEs. Further, frequency resources or an MCS for retransmission are identical to those in previous transmission in the case of non-adaptive HARQ, whereas frequency resources or an MCS for retransmission may differ from those in previous transmission in the case of adaptive HARQ. For example, in the case of asynchronous adaptive HARQ, the retransmission request message may include UE ID, RB allocation information, HARQ process ID/number, RV and NDI information because frequency resources or an MCS for retransmission vary with transmission time.

Figure 7:
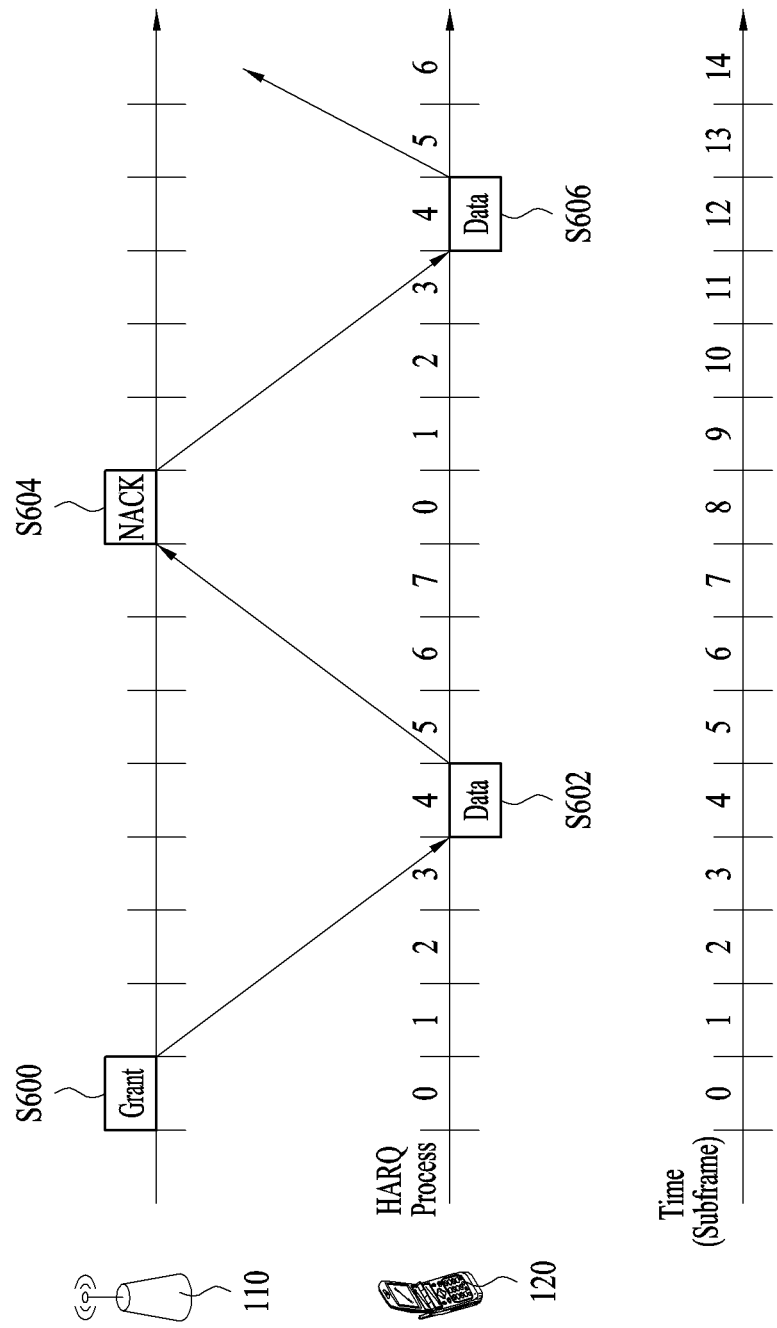
FIG. 7 illustrates UL HARQ (Uplink Hybrid Automatic Repeat reQuest) operation.

FIG. 7 illustrates a UL HARQ operation in an LTE(-A) system. In the LTE(-A) system, asynchronous adaptive HARQ is used as UL HARQ. When 8-channel HARQ is used, 0 to 7 are provided as HARQ process numbers. One HARQ process operates per TTI (e.g., subframe). Referring to FIG. 7, a UL grant is transmitted to a UE 120 through a PDCCH (S600). The UE 120 transmits UL data to an eNB 110 after 4 subframes from the time (e.g., subframe 0) at which the UL grant is received using an RB and an MCS designated by the UL grant (S602). The eNB 110 decodes the UL data received from the UE 120 and then generates ACK/NACK. When decoding of the UL data fails, the eNB 110 transmits NACK to the UE 120 (S604). The UE 120 retransmits the UL data after 4 subframes from the time at which NACK is received (S606). Initial transmission and retransmission of the UL data are performed through the same HARQ process (e.g., HARQ process 4). ACK/NACK information may be transmitted through a PHICH.

A description will be given of TDD signal transmission timing in a single carrier (or cell) situation with reference to FIGS. 8 to 14.

Figure 8:
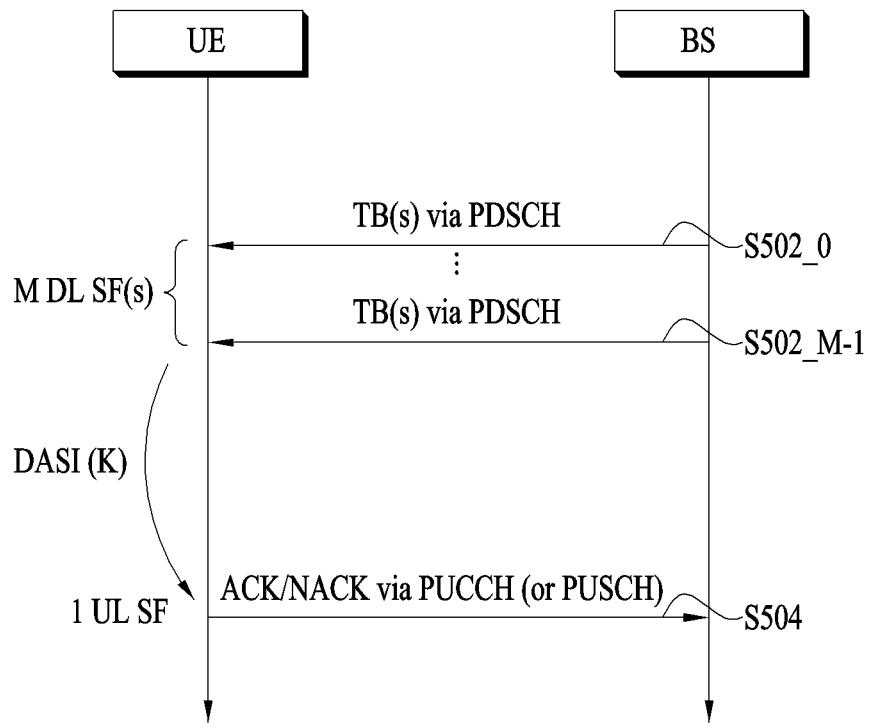
FIGS. 8 and 9 illustrate TDD UL ACK/NACK (Uplink Acknowledgement/Negative Acknowledgement) transmission timing in a single cell case.
Figure 9:
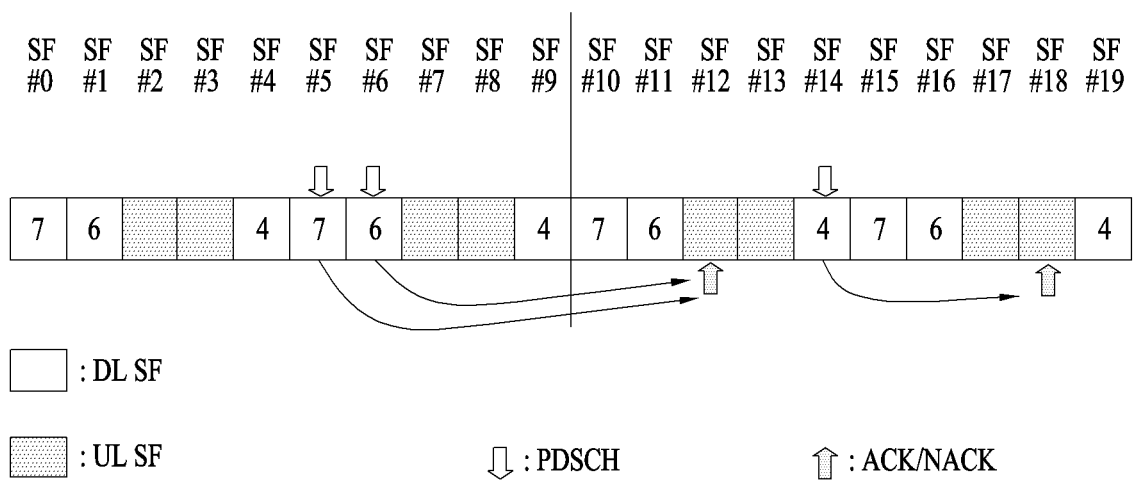

FIGS. 8 and 9 illustrate PDSCH-UL ACK/NACK timing. Here, UL ACK/NACK refers to ACK/NACK transmitted on uplink in response to DL data (e.g., PDSCH).

Referring to FIG. 8, a UE can receive one or more PDSCH signals in M DL subframes (SFs) (S502_0 to S502_M−1). Each PDSCH signal is used to transmit one or more (e.g. 2) transport blocks (TBs) according to transmission mode. A PDCCH signal indicating SPS (Semi-Persistent Scheduling) may also be received in step S502_0 to S502_M−1, which is not shown. When a PDSCH signal and/or an SPS release PDCCH signal is present in the M DL subframes, the UE transmits ACK/NACK through a UL subframe corresponding to the M DL subframes via processes for transmitting ACK/NACK (e.g. ACK/NACK (payload) generation, ACK/NACK resource allocation, etc.) (S504). ACK/NACK includes acknowledgement information about the PDSCH signal and/or an SPS release PDCCH received in step S502_0 to S502_M−1. While ACK/NACK is transmitted through a PUCCH basically, ACK/NACK is transmitted through a PUSCH when a PUSCH is transmitted at ACK/NACK transmission time. Various PUCCH formats shown in Table 3 can be used for ACK/NACK transmission. To reduce the number of ACK/NACK bits transmitted through a PUCCH format, various methods such as ACK/NACK bundling and ACK/NACK channel selection can be used.

As described above, in TDD, ACK/NACK relating to data received in the M DL subframes is transmitted through one UL subframe (i.e. M DL SF(s):1 UL SF) and the relationship therebetween is determined by a DASI (Downlink Association Set Index).

Table 4 shows DASI (K: {k0, k1, k−1}) defined in LTE(-A). Table 4 shows spacing between a UL subframe transmitting ACK/NACK and a DL subframe relating to the UL subframe. Specifically, when a PDCCH that indicates PDSCH transmission and/or SPS release is present in a subframe n−k (k∈K), the UE transmits ACK/NACK in a subframe n.

TABLE 4

| TDD UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

FIG. 9 illustrates UL ACK/NACK transmission timing when UL-DL configuration #1 is configured. In the figure, SF #0 to #9 and SF #10 to #19 respectively correspond to radio frames, and numerals in blocks denote UL subframes relating to DL subframes. For example, ACK/NACK for a PDSCH of SF #5 is transmitted in SF #5+7 (=SF #12) and ACK/NACK for a PDSCH of SF #6 is transmitted in SF #6+6 (=SF #12). Accordingly, both ACKs/NACKs for DL signals of SF #5/#6 are transmitted in SF #12. Similarly, ACK/NACK for a PDSCH of SF #14 is transmitted in SF #14+4 (=SF #18).

Figure 10:
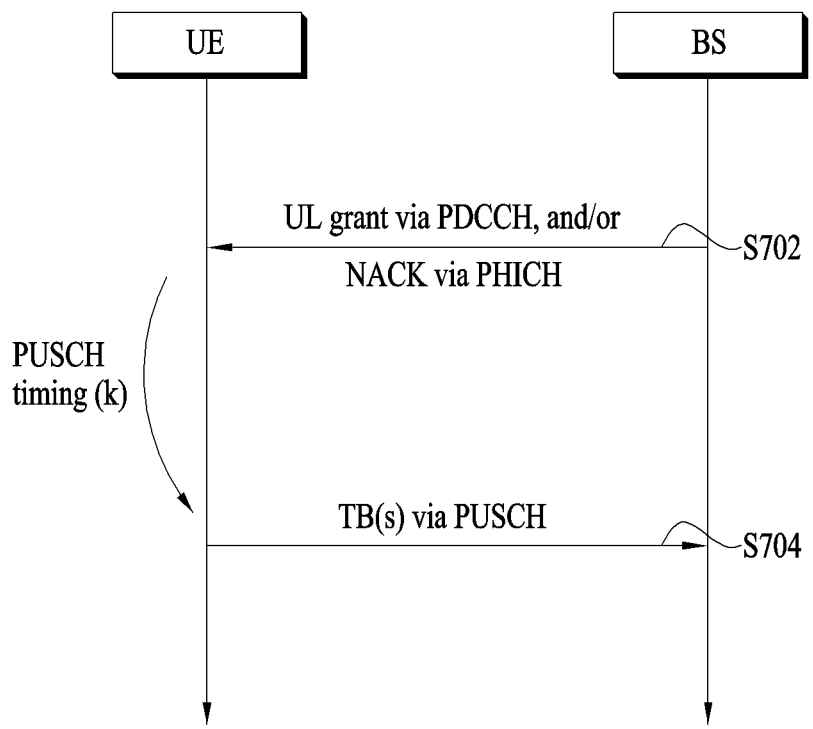
FIGS. 10 and 11 illustrate TDD PUSCH (Physical Uplink Shared Channel) transmission timing in a single cell case.
Figure 11:
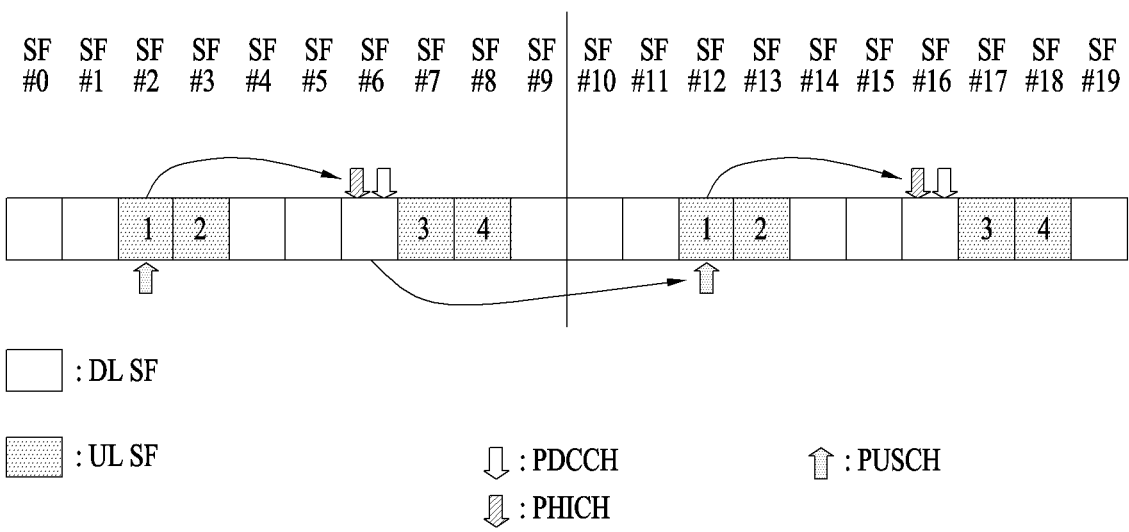

FIGS. 10 and 11 illustrate PHICH grant-PUSCH timing. A PUSCH can be transmitted corresponding to a PDCCH (UL grant) and/or a PHICH (NACK).

Referring to FIG. 10, the UE can receive a PDCCH (UL grant) and/or a PHICH (NACK) through a PDCCH (S702). Here, NACK corresponds to an ACK/NACK response to previous PUSCH transmission. In this case, the UE can initially transmit/retransmit one or more TBs through a PUSCH after k subframes via processes for PUSCH transmission (e.g. TB coding, TB-CW swiping, PUSCH resource allocation, etc.) (S704). The present embodiment is based on the assumption that a normal HARQ operation in which a PUSCH is transmitted once is performed. In this case, a PHICH and a UL grant corresponding to PUSCH transmission are present in the same subframe. However, in case of subframe bundling in which a PUSCH is transmitted multiple times through a plurality of subframes, a PHICH and a UL grant corresponding to PUSCH transmission may be present in different subframes.

Table 5 shows a UAI (Unlink Association Index) (k) for PUSCH transmission in LTE(-A). Table 5 shows spacing between a DL subframe from which a PHICH/UL grant is detected and a UL subframe relating to the DL subframe. Specifically, when a PHICH/UL grant is detected from a subframe n, the UE can transmit a PUSCH in a subframe n+k.

TABLE 5

| TDD UL-DL Configuration | subframe number n | | | | | | | | | |
|---|---|---|---|---|---|---|---|---|---|---|
| | 0 | 1 | 2 | 3 | 4 | 5 | 6 | 7 | 8 | 9 |
| 0 | 4 | 6 | | | | 4 | 6 | | | |
| 1 | | 6 | | | 4 | | 6 | | | 4 |
| 2 | | | | 4 | | | | | 4 | |
| 3 | 4 | | | | | | | | 4 | 4 |
| 4 | | | | | | | | | 4 | 4 |

TABLE 5-continued

| TDD UL-DL Configuration | subframe number n | | | | | | | | | |
|---|---|---|---|---|---|---|---|---|---|---|
| | 0 | 1 | 2 | 3 | 4 | 5 | 6 | 7 | 8 | 9 |
| 5 | | | | | | | | | 4 | |
| 6 | 7 | 7 | | | | | 7 | 7 | | 5 |

FIG. 11 illustrates PUSCH transmission timing when UL-DL configuration #1 is configured. In the figure, SF #0 to #9 and SF #10 to #19 respectively correspond to radio frames, and numerals in blocks denote UL subframes relating to DL subframes. For example, a PUSCH corresponding to PHICH/UL grant of SF #6 is transmitted in SF #6+6 (=SF #12) and a PUSCH corresponding to a PHICH/UL grant of SF #14 is transmitted in SF #14+4 (=SF #18).

Figure 12:
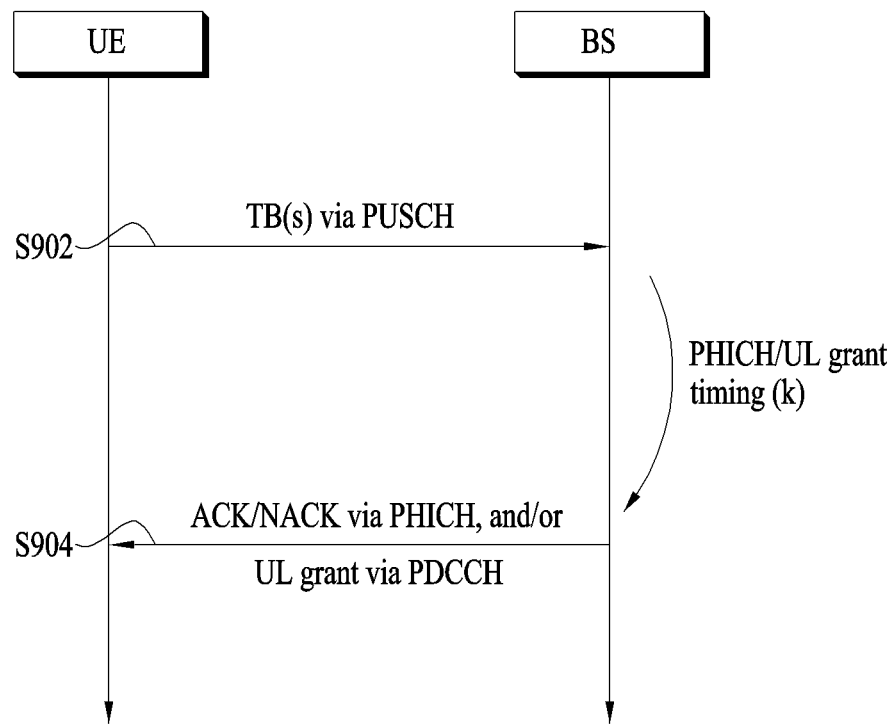
FIGS. 12 and 13 illustrate TDD DL ACK/NACK transmission timing in a single cell case.
Figure 13:
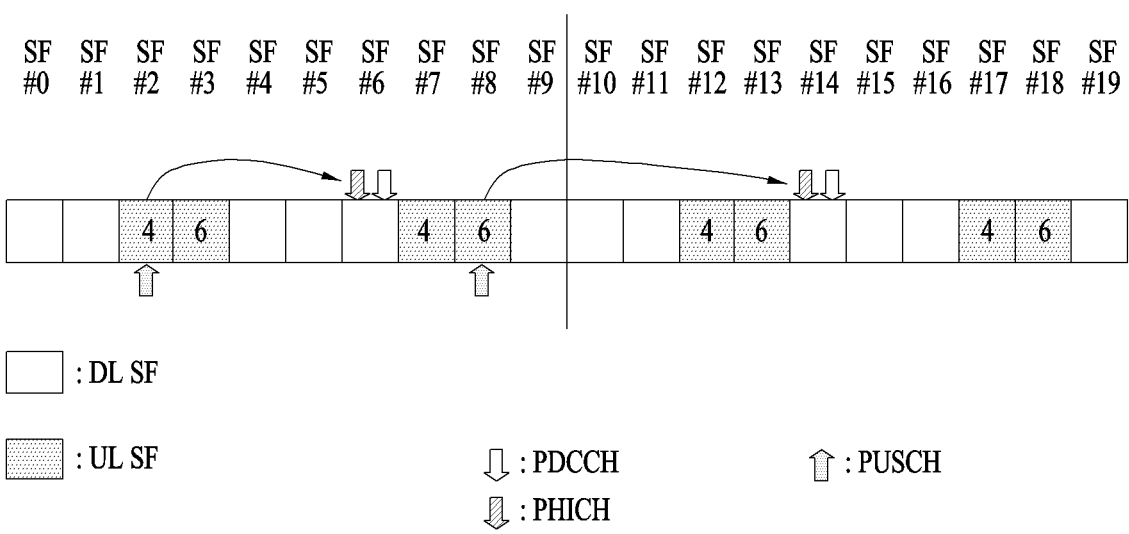

FIGS. 12 and 13 illustrate PUSCH-PHICH/UL grant timing. A PHICH is used to transmit DL ACK/NACK. Here, DL ACK/NACK means ACK/NACK transmitted on downlink as a response to UL data (e.g. PUSCH).

Referring to FIG. 12, the UE transmits a PUSCH signal to the BS (S902). Here, the PUSCH signal is used to transmit one or a plurality of (e.g. 2) TBs according to transmission mode. The BS can transmit ACK/NACK as a response to PUSCH transmission through a PHICH after k subframes via processes for ACK/NACK transmission (e.g. ACK/NACK generation, ACK/NACK resource allocation, etc.) (S904). ACK/NACK includes acknowledgement information about the PUSCH signal of step S902. When a response to PUSCH transmission is NACK, the BS can transmit a UL grant PDCCH for PUSCH retransmission to the UE after k subframe (S904). The present embodiment is based on the assumption that a normal HARQ operation in which a PUSCH is transmitted once is performed. In this case, a PHICH and UL grant used for PUSCH transmission can be transmitted in the same subframe. In case of subframe bundling, however, the PHICH and UL grant used for PUSCH transmission can be transmitted in different subframes.

Table 6 shows a UAI for PHICH/UL grant transmission in LTE(-A). Table 6 shows spacing between a DL subframe in which a PHICH/UL grant is present and a UL subframe relating to the DL subframe. Specifically, a PHICH/UL grant of a subframe i corresponds to PUSCH transmission through a subframe i-k.

TABLE 6

| TDD UL-DL Configuration | subframe number i | | | | | | | | | |
|---|---|---|---|---|---|---|---|---|---|---|
| | 0 | 1 | 2 | 3 | 4 | 5 | 6 | 7 | 8 | 9 |
| 0 | 7 | 4 | | | | 7 | 4 | | | |
| 1 | | 4 | | 6 | 6 | | 4 | | | 6 |
| 2 | | | | | | | | | 6 | |
| 3 | 6 | | | | | | | | 6 | 6 |
| 4 | | | | | | | | | 6 | 6 |
| 5 | | | | | | | | | 6 | |
| 6 | 6 | 4 | | | | 7 | 4 | | | 6 |

FIG. 13 illustrates PHICH/UL grant transmission timing when UL-DL configuration #1 is configured. In the figure, SF #0 to #9 and SF #10 to #19 respectively correspond to radio frames, and numerals in blocks denote DL subframes relating to UL subframes. For example, a PHICH/UL grant corresponding to a PUSCH of SF #2 is transmitted in SF #2+4 (=SF #6) and a PHICH/UL grant corresponding to a PUSCH of SF #8 is transmitted in SF #8+6 (=SF #14).

PHICH resource allocation will now be described. When a PUSCH is transmitted in subframe # n, the UE determines a PHICH resource corresponding to the PUSCH in subframe #(n+$k_{PHICH}$). In case of FDD, $k_{PHICH}$ has a fixed value (e.g. 4). In case of TDD, $k_{PHICH}$ has a value depending on UL-DL configuration. Table 7 shows $k_{PHICH}$ for TDD is equivalent to Table 6.

TABLE 7

| TDD UL-DL Configuration | UL subframe index n | | | | | | | | | |
|---|---|---|---|---|---|---|---|---|---|---|
| | 0 | 1 | 2 | 3 | 4 | 5 | 6 | 7 | 8 | 9 |
| 0 | | | 4 | 7 | 6 | | | 4 | 7 | 6 |
| 1 | | | 4 | 6 | | | | 4 | 6 | |
| 2 | | | 6 | | | | | 6 | | |
| 3 | | | 6 | 6 | 6 | | | | | |
| 4 | | | 6 | 6 | | | | | | |
| 5 | | | 6 | | | | | | | |
| 6 | | | 4 | 6 | 6 | | | 4 | 7 | |

A PHICH resource is provided by [PHICH group index, orthogonal sequence index]. The PHICH group index and the orthogonal sequence index are determined using (i) a lowest PRB index used for PUSCH transmission and (ii) a 3-bit field value for DMRS (Demodulation Reference Signal) cyclic shift. Here, (i) and (ii) are indicated by a UL grant PDCCH.

A description will be given of a HARQ process. The UE executes a plurality of parallel HARQ processes for UL transmission. The plurality of parallel HARQ processes is used to continuously perform UL transmission while the UE waits for HARQ feedback representing whether previous UL transmission has been successful or not. Each HARQ process relates to a HARQ buffer of a MAC (Medium Access Control) layer. Each HARQ process manages the number of transmissions of a MAC PDU (Physical Data Unit) in the buffer, HARQ feedback for the MAC PDU in the buffer, and a state parameter regarding a current redundancy version.

In case of LTE(-A) FDD, the number of UL HARQ processes for non-subframe bundling operation (i.e. normal HARQ operation) is 8. In case of LTE(-A) TDD, the number of UL HARQ processes and HARQ RTT (Round Trip Time) are configured differently according to DL-UL configurations because the number of UL subframes depends on UL-DL configuration. Here, the HARQ RTT may be a time interval (in the unit of SF or ms, for example) between a time when a UL grant is received and a time when a PHICH (corresponding to the UL grant) is received through transmission of a PUSCH (corresponding the UL grant) or a time interval between a PUSCH transmission time and a PUSCH retransmission time.

The number of UL HARQ processes varies. When subframe bundling is applied, a bundle of PUSCHs configured of 4 contiguous UL subframes is transmitted in FDD and TDD. Accordingly, a HARQ operation/process when subframe bundling is applied is different from the normal HARQ operation/process.

Table 8 shows the number of synchronous UL HARQ processes and HARQ RTT in TDD. When the UL HARQ RTT is 10 [SFs or ms] (UL-DL configurations #1, #2, #3, #4 and #5), one UL HARQ process uses one fixed UL SF timing. When the UL HARQ RTT does not correspond to 10 [SFs or ms] (UL-DL configurations #0 and #6), one UL HARQ process uses a plurality of UL SF timings (instead of one fixed UL SF timing) while hopping. For example, in case of UL-DL configuration #6, PUSCH transmission timings in one UL HARQ process are: SF #2: PUSCH=>SF #13: PUSCH (RTT: 11 SFs)=>SF #24: PUSCH (RTT: 11 SFs)=>SF #37: PUSCH (RTT: 13 SFs)=>SF #48: PUSCH (RTT: 11 SFs)=>SF #52: PUSCH (RTT: 14 SFs).

TABLE 8

| UL-DL configuration | Number of UL SFs | Number of HARQ processes for normal HARQ operation | HARQ RTT |
|---|---|---|---|
| 0 | 6 | 7 | 11 or 13 |
| 1 | 4 | 4 | 10 |
| 2 | 2 | 2 | 10 |
| 3 | 3 | 3 | 10 |
| 4 | 2 | 2 | 10 |
| 5 | 1 | 1 | 10 |
| 6 | 5 | 6 | 11 or 13 or 14 |

In case of TDD UL-DL configurations #1 to #6 and normal HARQ operation, the UE transmits a corresponding PUSCH signal in subframe n+k (refer to Table 5) according to UL grant PDCCH and/or PHICH information upon detection of the UL grant PDCCH and/or PHICH information in subframe n.

In case of TDD UL-DL configuration #0 and the normal HARQ operation, when a UL DCI grant PDCCH and/or a PHICH are detected from subframe n, PUSCH transmission timing of the UE is varied according to conditions. When the MSB (Most Significant bit) of a UL index in DCI is 1 or the PHICH is received through a resource corresponding to $I_{PHICH}=0$ in subframe #0 or #5, the UE transmits the corresponding PUSCH signal in subframe n+k (refer to Table 5). When the LSB (Least Significant bit) of the UL index in the DCI is 1, the PHICH is received through a resource corresponding to $I_{PHICH}=1$ in subframe #0 or #5, or the PHICH is received in subframe #1 or #6, UE transmits the corresponding PUSCH signal in subframe n+7. When both the MSB and LSB in the DCI are set, the UE transmits the corresponding PUSCH signal in subframe n+k (refer to Table 5) and subframe n+7.

Figure 14:
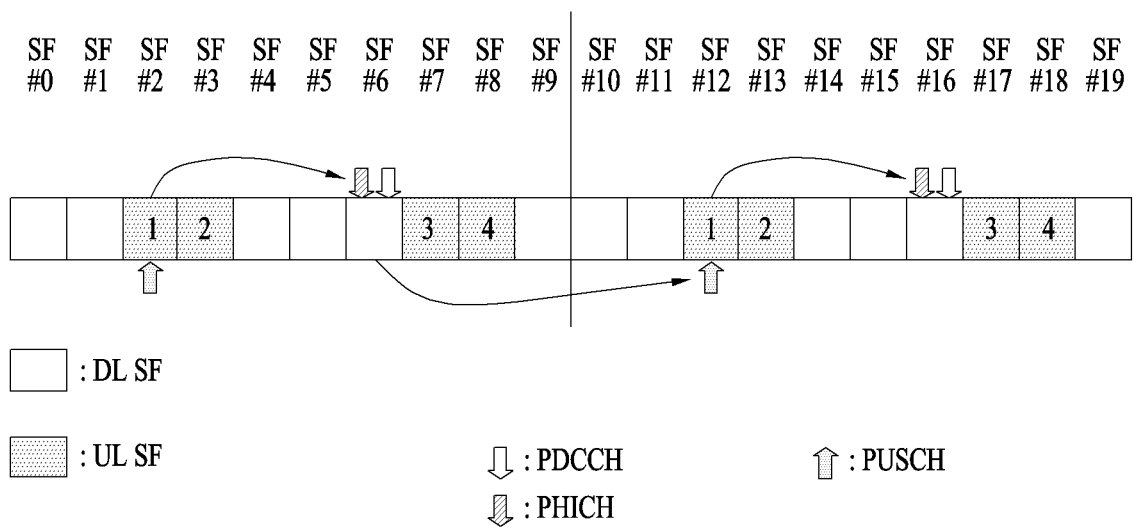
FIG. 14 illustrates a TDD HARQ (Hybrid Automatic Repeat request) process in a single cell situation.

FIG. 14 illustrates a synchronous UL HARQ process when UL-DL configuration #1 is configured. Numerals in blocks denote UL HARQ process numbers. The synchronous UL HARQ process shown in FIG. 14 corresponds to a normal HARQ process. Referring to FIG. 14, HARQ process #1 involves SF #2, SF #6, SF #12 and SF #16. For example, if an initial PUSCH signal (e.g. RV=0) is transmitted in SF #2, a UL grant PDCCH and/or a PHICH corresponding to the PUSCH signal can be received in SF #6 and a (retransmission) PUSCH signal (e.g. RV=2) corresponding to the initial PUSCH signal can be transmitted in SF #12. Accordingly, 4 UL HARQ processes having an RTT (Round Trip Time) of 10 SFs (or 10 ms) are present in case of UL-DL configuration #1.

Figure 15:
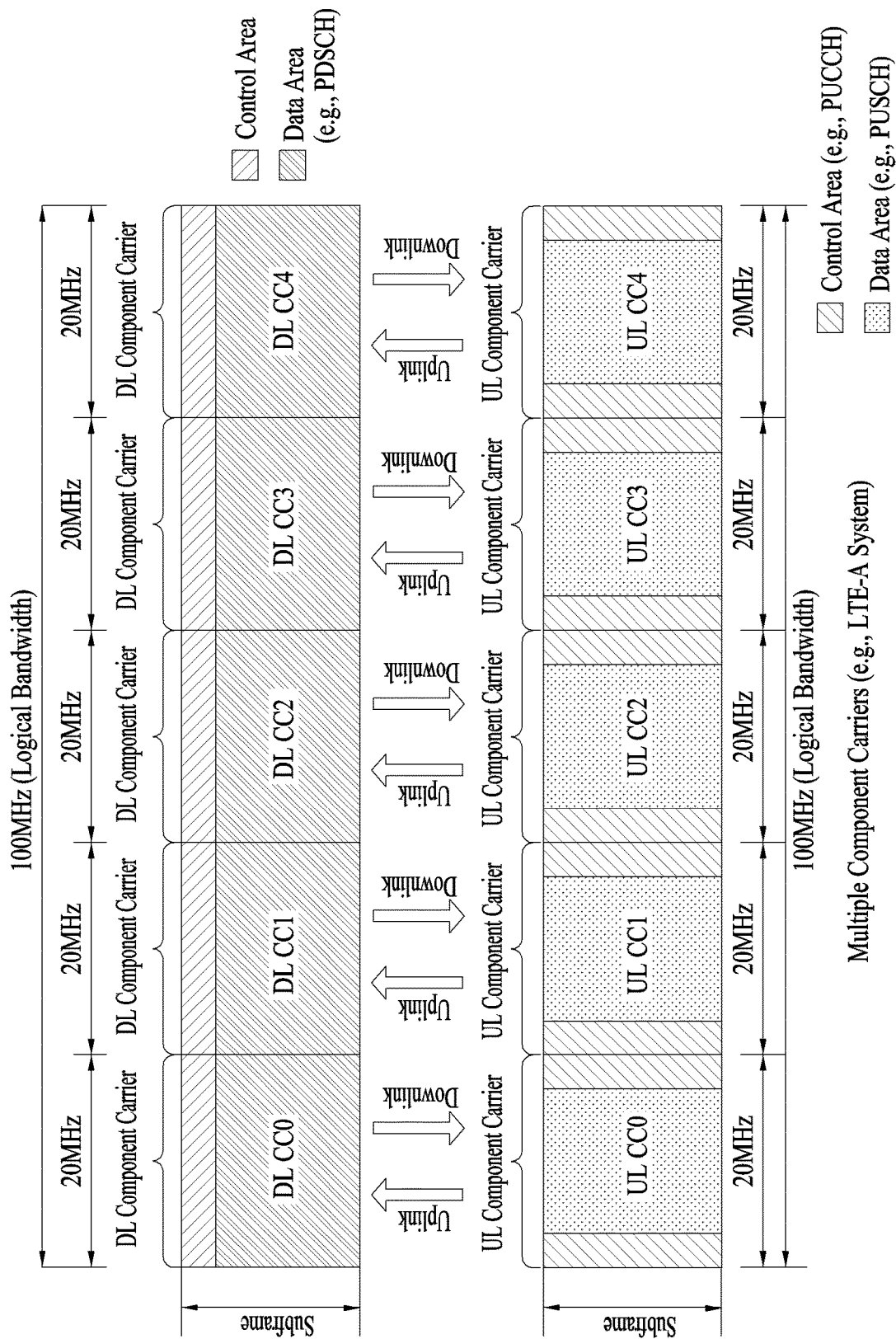
FIG. 15 illustrates a carrier aggregation (CA)-based wireless communication system.

FIG. 15 illustrates carrier aggregation (CA) communication system.

Referring to FIG. 15, a plurality of UL/DL component carriers (CCs) can be aggregated to support a wider UL/DL bandwidth. The CCs may be contiguous or non-contiguous in the frequency domain. Bandwidths of the CCs can be independently determined. Asymmetrical CA in which the number of UL CCs is different from the number of DL CCs can be implemented. Control information may be transmitted/received only through a specific CC. This specific CC may be referred to as a primary CC and other CCs may be referred to as secondary CCs. For example, when cross-carrier scheduling (or cross-CC scheduling) is applied, a PDCCH for downlink allocation can be transmitted on DL CC #0 and a PDSCH corresponding thereto can be transmitted on DL CC #2. The term "component carrier" may be replaced by other equivalent terms (e.g. "carrier", "cell", etc.).

For cross-CC scheduling, a carrier indicator field (CIF) is used. Presence or absence of the CIF in a PDCCH can be determined by higher layer signaling (e.g. RRC signaling) semi-statically and UE-specifically (or UE group-specifically). The baseline of PDCCH transmission is summarized as follows.

CIF disabled: a PDCCH on a DL CC is used to allocate a PDSCH resource on the same DL CC or a PUSCH resource on a linked UL CC.
No CIF
CIF enabled: a PDCCH on a DL CC can be used to allocate a PDSCH or PUSCH resource on a specific DL/UL CC from among a plurality of aggregated DL/UL CCs using the CIF.
LTE DCI format extended to have CIF
CIF corresponds to a fixed x-bit field (e.g. x=3) (when CIF is set)
CIF position is fixed irrespective of DIC format size (when CIF is set)

When the CIF is present, the BS may allocate a monitoring DL CC (set) to reduce BD complexity of the UE. For PDSCH/PUSCH scheduling, the UE may detect/decode a PDCCH only on the corresponding DL CCs. The BS may transmit the PDCCH only through the monitoring DL CC (set). The monitoring DL CC set may be set UE-specifically, UE-group-specifically or cell-specifically.

Figure 16:
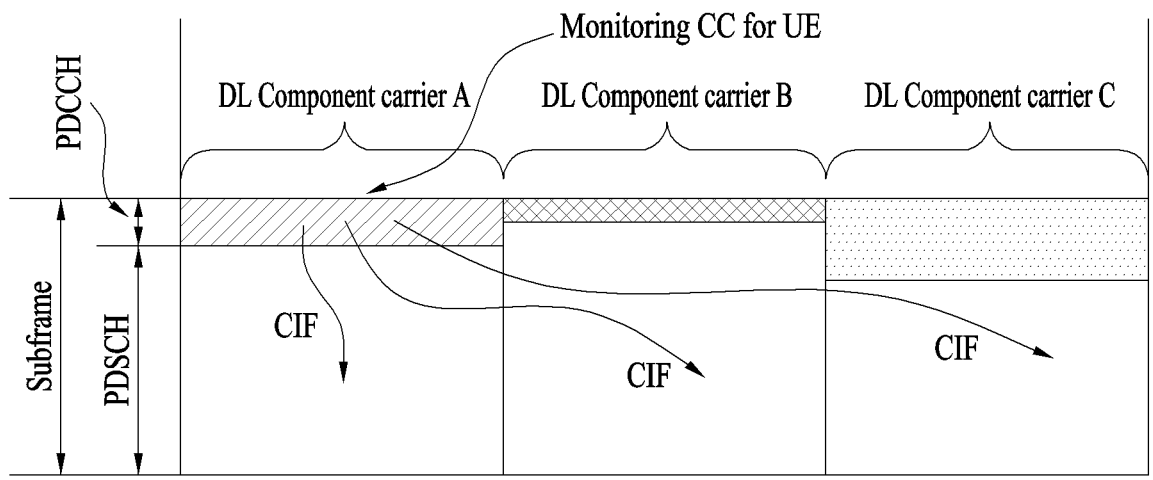
FIG. 16 illustrates cross-carrier scheduling.

FIG. 16 illustrates scheduling when a plurality of carriers is aggregated. It is assumed that 3 DL CCs are aggregated and DL CC A is set to a PDCCH CC. DL CC A~C may be referred to as a serving CC, serving carrier, serving cell, etc. When the CIF is disabled, each DL CC can transmit only a PDCCH that schedules a PDSCH corresponding to the DL CC without a CIF according to LTE PDCCH rule (non-cross-CC scheduling). When the CIF is enabled through UE-specific (or UE-group-specific or cell-specific) higher layer signaling, a specific CC (e.g. DL CC A) can transmit not only the PDCCH that schedules the PDSCH of DL CC A but also PDCCHs that schedule PDSCHs of other DL CCs using the CIF (cross-scheduling). A PDCCH is not transmitted on DL CC B and DL CC C.

Figure 17:
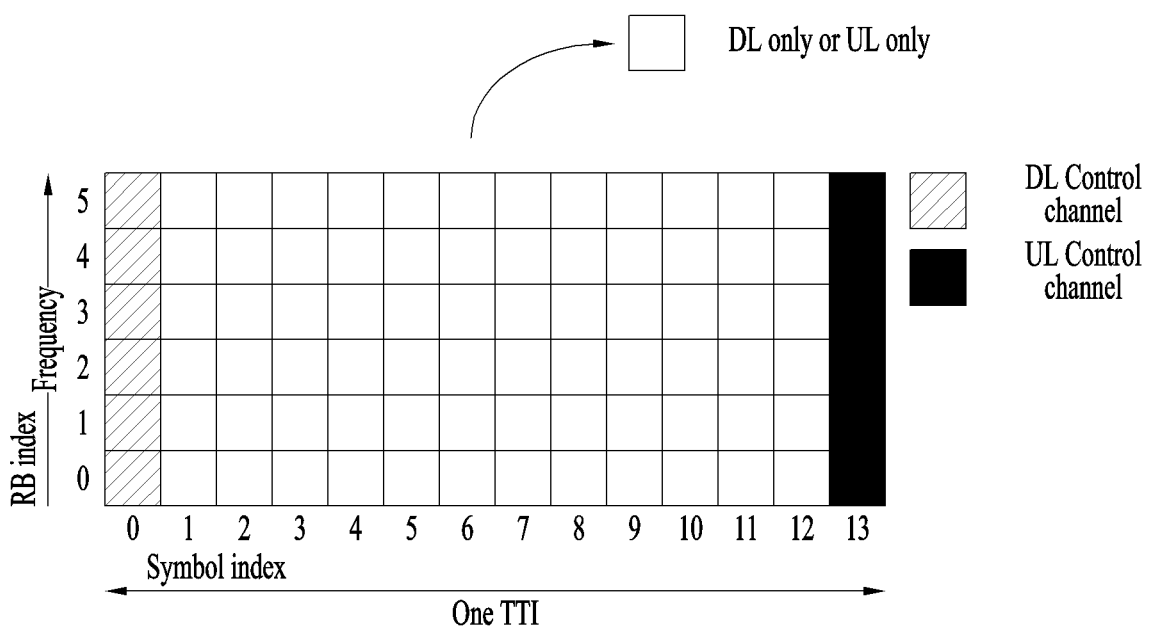
FIG. 17 illustrates a structure of a self-contained subframe.

Meanwhile, a next generation RAT (radio access technology) is considering a self-contained subframe to minimize data transmission latency. FIG. 17 illustrates a structure of a self-contained subframe. In FIG. 17, oblique line areas indicate DL control regions and black colored areas indicate UL control regions. Areas having no mark may be used for DL data transmission or UL data transmission. In this structure, DL transmission and UL transmission are performed in due order within one subframe, whereby DL data transmission and UL ACK/NACK transmission can be performed within the subframe. Or, UL grant transmission and UL data reception can be performed within the subframe as well. As a result, the time required for data re-transmission may be reduced when an error occurs in data transmission, whereby latency of final data transfer may be minimized.

Examples of the self-contained subframe type that may be configured in the system may consider four subframe types as follows.
DL control period+DL data period+GP (guard period)+UL control period
DL control period+DL data period
DL control period+GP+UL data period+UL control period
DL control period+GP+UL data period PDFICH, PHICH, and PDCCH can be transmitted in a DL control period and PDSCH can be transmitted in a DL data period. PUCCH can be transmitted in a UL control period and PUSCH can be transmitted in a UL data period. A time gap for switching from a transmission mode to a reception mode or vice versa is required for an eNB and a UE. A GP provides the time gap. To this end, some OFDM symbols at the time when DL is switched to UL in the self-contained subframe structure are configured as a GP.

Embodiments

A new radio access technology (RAT) system may be designed to support various use scenarios (or service types and traffic types) such as enhanced mobile broadband (eMBB), ultra-reliable and low latency communications (URLLC), massive machine type communications (mMTC), and so on. The various use scenarios (hereinafter, referred to as use cases) may have different requirements, particularly in terms of (user-plane) latency. For example, the respective use cases may require different (maximum) latencies in the order of URLLC (e.g., 0.5 ms)<eMBB (e.g., 4 ms)<mMTC (e.g., Xms>4 ms). Accordingly, a different TTI length may be set for each use case. For example, different TTI lengths may be given in the order of URLLC<eMBB<mMTC. Herein, a TTI may be defined as a (minimum) time interval between data schedulings or a (maximum) transmission time duration of single data. The (minimum) time interval between data schedulings or the (maximum) transmission time duration of single data may be represented as an integer/real number multiple of a subframe or slot.

Meanwhile, configuration of an HARQ timing and operation of an HARQ process for DL/UL data scheduling/transmission may vary according to a latency requirement/TTI length (a use case represented by the latency requirement/TTI length), and a UE capability related to DL/UL signal processing (e.g., DL control/data channel decoding, UL transmission preparation including encoding, etc.). For example, a (minimum) HARQ timing latency may be set to be smaller for URLLC than for eMBB, whereas the (maximum) number of HARQ processes may be set to be larger for eMBB than for URLLC. Herein, an HARQ timing may represent a delay between DL data reception and HARQ-ACK transmission, a delay between UL grant reception and UL data transmission, or the like, expressed as an integer multiple of a TTI.

Methods of effectively configuring a DL/UL HARQ timing and operating an HARQ process in consideration of use cases having different latency requirements (or different TTI lengths corresponding to the use cases) will be proposed below. In the present invention, (i) the terms, TTI and subframe (SF) may be used in the same meaning in terms of a time duration or a time period (e.g., an SF offset may be considered to be a TTI offset), or (ii) a different TTI length may be set for each use case, and a single common SF length may be set for all use cases (e.g., an SF may have a time period spanning as long as a specific one of a plurality of TTI lengths). In the case of (ii), (ii-1) an SF may be set to a time period spanning as long as a minimum TTI (e.g., a TTI length set for URLLC), or (ii-2) an SF may be set to a time period spanning as long as a normal TTI (e.g., a TTI length set for eMBB). In the case of (ii-1), a TTI for a specific use case may be configured with one or more SFs (or slots), and in the case of (ii-2), a TTI for a specific use case may be configured with one or more SFs (or slots), or a plurality of TTI may be included in one SF (or slot).

For the convenience of description, each (minimum) HARQ timing latency required for a UE and an eNB will be defined as follows.

1) dUE_DL: a delay between DL data reception and HARQ-ACK transmission (at the UE). The UE may report its dUE_DL information (capability) to the eNB at an appropriate time (e.g., during initial access or RRC connection). Different dUE_DL information and dUE_UL information may be supported for the same UE.

2) dNB_DL: a delay between HARQ-ACK reception and DL data retransmission (at the eNB). The eNB may signal dNB_DL information to the UE at an appropriate time. dNB_DL information may be configured to be different from dNB_UL information. Or, the eNB may signal RTT_DL information or Harq_DL information to the UE at an appropriate time, and the UE may calculate dNB_DL information from the RTD_DL information or Harq_DL information.

3) RTT_DL: a (minimum) delay between DL data transmissions in the same HARQ process (e.g., dUE_DL+dNB_DL).

4) Harq_DL: the (maximum) number of DL HARQ processes (e.g., the maximum number of TTIs within RTT_DL). The number of bits indicating an HARQ process ID in DL grant DCI, and/or the initial number of bits to be stored per DL data (e.g., transport block (TB)) or per HARQ process from the viewpoint of a DL soft buffer may be determined to be different according to an Harq_DL value.

5) dUE_UL: a delay between UL grant reception and UL data transmission (at the UE). The UE may report its dUE_UL information (capability) to the eNB at an appropriate time (e.g., during initial access or RRC connection). Different dUE_UL information and dUE_DL information may be supported for the same UE.

6) dNB_UL: a delay between UL data reception and transmission of a retransmission UL grant (at the eNB). The eNB may signal dNB_UL information to the UE at an appropriate time. dNB_UL information may be configured to be different from dNB_DL information. Or, the eNB may signal RTT_UL information or Harq_UL information to the UE at an appropriate time, and the UE may calculate dNB_UL information from the RTT_UL information or Harq_UL information.

7) RTT_UL: a (minimum) delay between UL data transmissions in the same HARQ process (e.g., dUE_UL+dNB_UL).

8) Harq_UL: the (maximum) number of UL HARQ processes (e.g., the maximum number of TTIs within RTT_UL). The number of bits indicating an HARQ process ID in UL grant DCI, and/or the initial number of bits to be stored per UL data (e.g., TB) or per HARQ process from the viewpoint of a UL soft buffer may be determined to be different according to an Harq_UL value.

In the present invention, the terms TTI length, use case, and subcarrier (SC) spacing (SCS) used for OFDM modulation and demodulation may be used in similar meanings or interchangeable with each other. For example, a short TTI length may have a similar meaning to that of a large SCS or URLLC, and a long TTI length may have a similar meaning to that of a small SCS or mMTC. A normal TTI length (between a short TTI length and a long TTI length) may have a similar meaning to that of a normal SCS (between a small SCS and a large SCS) or eMBB. An HARQ timing latency may be given as an integer multiple (or a real number multiple) of an SF/slot/TTI length, or an integer multiple of an OFDM symbol period. Herein, an OFDM symbol generically refers to any OFDM-based symbol (e.g., an OFDM symbol, an SC-FDMA symbol, etc.), and may be referred to shortly as a symbol. Meanwhile, a TTI length may be used in a similar meaning to or replaced with that of the number of SFs/slots/symbols included in a single TTI, that is, the number of SFs/slots/symbols per TTI. For example, a long TTI length may be used in a similar meaning to a large number of SFs/slots/symbols per TTI, and a short TTI length may be used in a similar meaning to a small number of SFs/slots/symbols per TTI. Further, long/short/increase/decrease as used in the present disclosure may mean relatively long/short/increase/decrease, or long/short/increase/decrease with respect to a specific reference value. In an example of the latter case, if it is assumed that for a TTI length of X, an HARQ timing latency (or a minimum HARQ RTT) is configured with A TTIs, and for a TTI length of Y, the HARQ timing latency (or the minimum HARQ RTT) is configured with B TTIs, it may be said that the HARQ timing latency is long/short/increased/decreased for one of X and Y according to a comparison between the values of A and B. Further, the following methods may be adopted in combination.

[Method 1] Different HARQ Timing Latencies are Configured for a UE and an eNB.

In this method, different dUE_DL and dNB_DL values may be set (from the viewpoint of DL HARQ). For example, the dUE_DL value may be set to be larger than the dNB_DL value, or vice versa. An Harq_DL value (maximum number of TTIs within RTT_DL) may be calculated on the basis of an RTT_DL value determined according to the dUE_DL and dNB_DL values (e.g., dUE_DL+dNB_DL).

Figure 18:
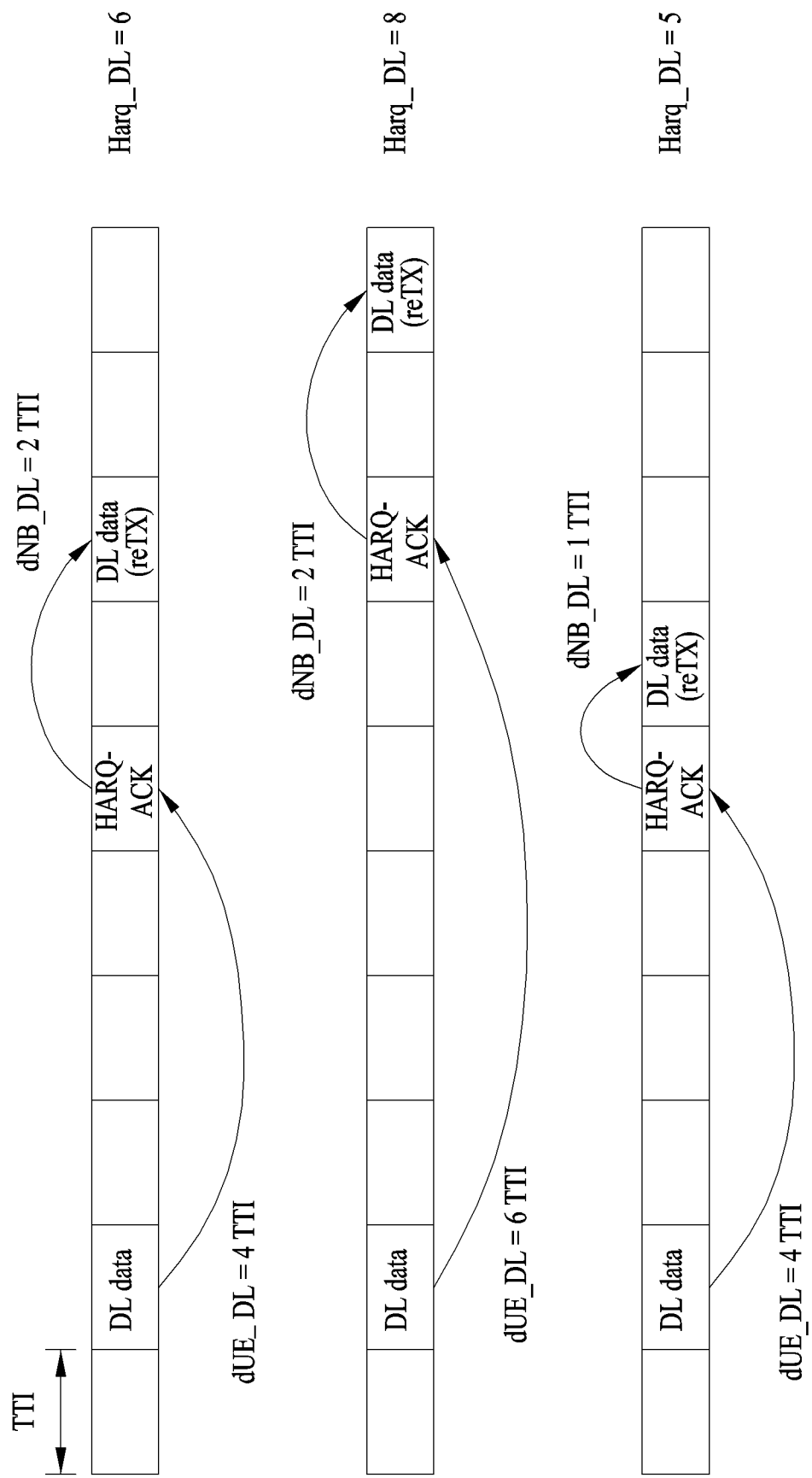
Figure 19:
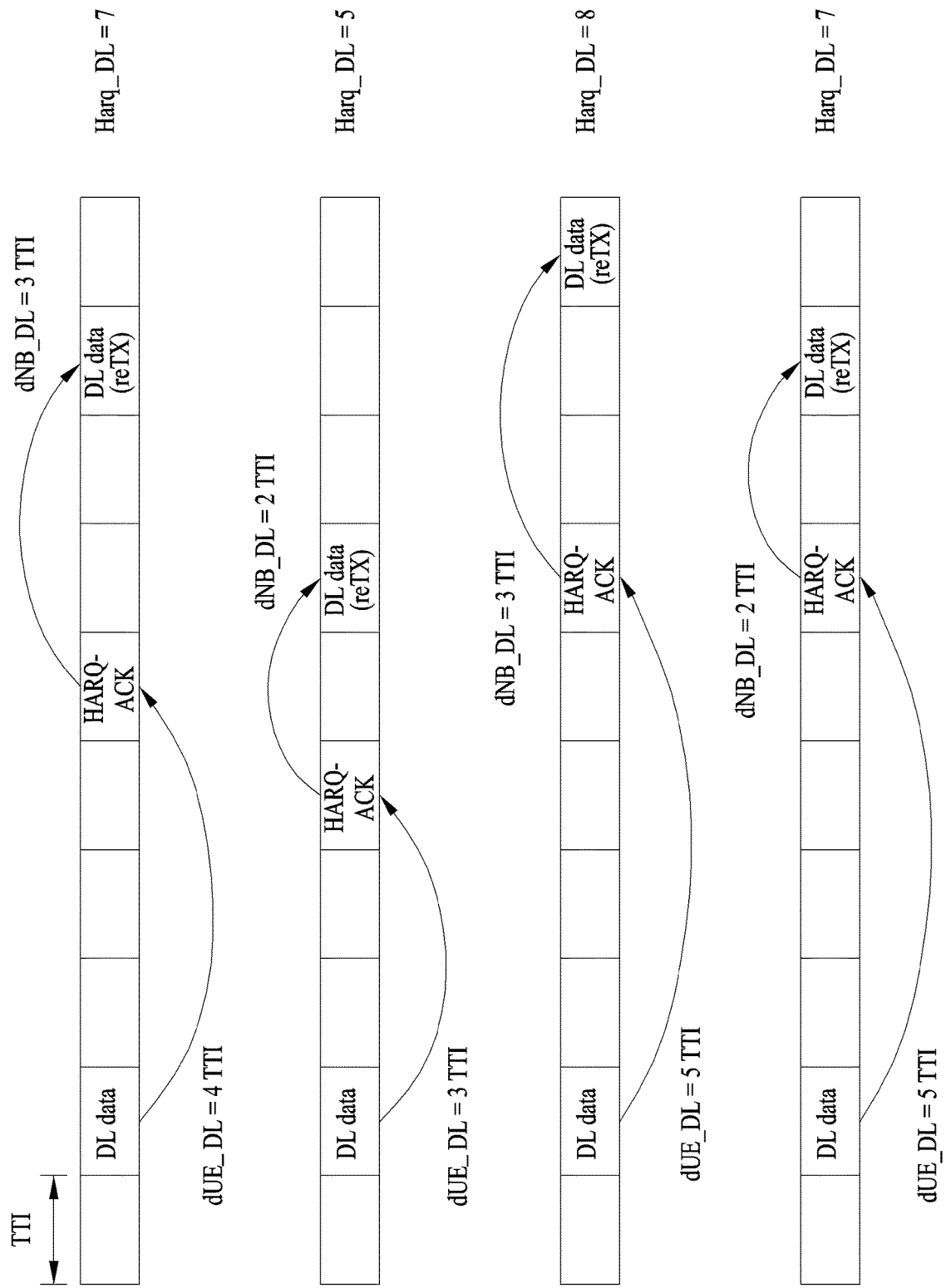

For example, for a specific use case (e.g., eMBB) or a specific TTI length (e.g., 14 or 12 OFDM symbols), dUE_DL=(N×TTI)>dNB_DL=(M×TTI) (N>M). N and M are integers, and N may be a multiple of M. The Harq_DL value may be determined to be (N+M). Specific examples are illustrated in FIGS. 18 and 19. Meanwhile, if a TTI length is set to be small (e.g., 7 or 6 OFDM symbols) from the viewpoint of a specific use case (e.g., eMBB), N and M values (and Harq_DL based on N and M) may be scaled an integer times (e.g., twice). Further, in operation with the use case (eMBB) and the TTI length (e.g., 14 or 12 OFDM symbols), an SF offset (hereinafter, referred to as an FDD SF offset) may not be set separately between DL and UL carriers in an FDD situation (i.e., zero SF offset).

1) N=2M=4 TTIs, and Harq_DL=6 (the first drawing in FIG. 18)

2) N=3M=6 TTIs, and Harq_DL=8 (the second drawing in FIG. 18)

3) N=4M=4 TTIs, and Harq_DL=5 (the third drawing in FIG. 18)

4) N=M+1=4 TTIs or 3 TTIs, and Harq_DL=7 or 5 (the first and second drawings in FIG. 19)

5) N=M+2=4 TTIs or 5 TTIs, and Harq_DL=6 or 8 (the third drawing in FIG. 19)

6) N=M+3=4 TTIs or 5 TTIs, and Harq_DL=5 or 7 (the fourth drawing in FIG. 19)

In another example, for another specific use case (e.g., URLLC) or another specific TTI length (e.g., 7 (or 6) or 4 (or 3) OFDM symbols), dUE_DL=(n×TTI)>dNB_DL=(m×TTI) (n>m). Herein, n and m are real numbers, and n may be given as a multiple of m. Harq_DL may be determined to be (n+m). A specific example is given below. If a TTI length is set to be small (e.g., 4 (or 3) or 2 OFDM symbols) from the viewpoint of a specific use case (e.g., URLLC), n and m values (and Harq_DL based on n and m) may be scaled an integer times (e.g., twice). Further, in operation with the use case (e.g., URLLC) and the TTI length (e.g., 7 (or 6) or 4 (or 3) OFDM symbols), a non-zero SF offset may be set between DL and UL carriers in an FDD situation.

1) n+m=1 TTI, and Harq_DL=1

2) n+m=2 TTIs, and Harq_DL=2

3) n+m=3 TTIs, and Harq_DL=3
4) n+m=4 TTIs, and Harq_DL=4

Meanwhile, similarly to DL HARQ, different dUE_UL and dNB_UL values may be set for UL HARQ. For example, the dUE_UL value may be set to be larger than the dNB_UL value, or vice versa. An Harq_UL value (maximum number of TTIs within RTT_UL) may be calculated on the basis of an RTT_UL value determined according to the dUE_UL and dNB_UL values (e.g., dUE_UL+dNB_UL). For example, the proposed method and example for DL HARQ may be applied in a similar manner, with dUE_DL and dNB_DL replaced with dUE_UL and dNB_UL, respectively (or dUE_DL and dNB_DL replaced with dNB_UL and dUE_UL, respectively).

[Method 2] Different HARQ Timing Latencies are Configured for DL HARQ and UL HARQ.

In this method, different relationships may be established between dUE_DL and dNB_DL in DL HARQ, and between dUE_UL and dNB_UL in UL HARQ as follows. Harq_DL/Harq_UL may be calculated on the basis of the resulting determined RTT_DL/RTT_UL value.

1) dUE_DL>dNB_DL for DL HARQ, and dUE_UL>dNB_UL for UL HARQ. That is, a larger time budget may be assigned to the UE than the eNB, for processing a transmission signal and a received signal.

2) dUE_DL>dNB_DL for DL HARQ, and dUE_UL<dNB_UL for UL HARQ. That is, a larger time budget may be assigned for decoding of DL/UL data than encoding of the DL/UL data.

3) dUE_DL>dNB_DL for DL HARQ, and dUE_UL=dNB_UL for UL HARQ. That is, a relatively large time budget may be assigned for DL data decoding at the UE.

4) dUE_DL=dNB_DL for DL HARQ, and dUE_UL>dNB_UL for UL HARQ. That is, a relatively large time budget may be assigned for UL data encoding at the UE.

5) dUE_DL=dNB_DL for DL HARQ, and dUE_UL<dNB_UL for UL HARQ. That is, a relatively large time budget may be assigned for UL data decoding at the eNB.

In the case of 1), dUE_DL=dUE_UL and dNB_DL=dNB_UL. Each of an N value corresponding to dUE_DL and an M value corresponding to dNB_DL may be set to, for example, one of the values given in [Method 1]. FIG. 20 illustrates an exemplary DL/UL HARQ process operation in the case where N=2M=4 TTIs (refer to the first drawing in FIG. 18) in [Method 1]. In this case, a set of SFs (e.g., a DL grant/data transmission SF, an HARQ-ACK transmission SF, and a retransmission DL grant transmission SF) included in one DL HARQ process may be identical to a set of SFs (e.g., a UL grant transmission SF, a UL data transmission SF, and a retransmission UL grant transmission SF) included in one UL HARQ process. Meanwhile, even though the UE actually reports different dUE_DL and dUE_UL values, dUE_DL and dUE_UL values used in determining final RTT_DL and RTT_UL values (Harq_DL and Harq_UL based on the RTT_DL and RTT_UL values, respectively) may be set equally to the larger between the dUE_DL and dUE_UL values reported by the UE. Likewise, even though dNB_DL and dNB_UL values based on the actual capability of the eNB are different, dNB_DL and dNB_UL values used in determining final RTT_DL and RTT_UL values (Harq_DL and Harq_UL based on the RTT_DL and RTT_UL values, respectively) may be set equally to the larger between the dNB_DL and dNB_UL values based on the capability of the eNB.

In the case of 2), dUE_DL=dNB_UL and dNB_DL=dUE_UL. Each of an N value corresponding to dUE_DL and an M value corresponding to dNB_DL may be set to, for example, one of the values given in [Method 1]. FIG. 21 illustrates an exemplary DL/UL HARQ process operation in the case where N=2M=4 TTIs (refer to the first drawing in FIG. 18) in [Method 1]. In this case, a set of SFs included in one DL HARQ process may not be identical to a set of SFs included in one UL HARQ process. Meanwhile, when a dUE_DL value reported by the UE is different from a dNB_UL value based on the actual capability of the eNB, dUE_DL and dUE_UL values used in determining final RTT_DL and RTT_UL values (Harq_DL and Harq_UL based on the RTT_DL and RTT_UL values, respectively) may be set equally to the larger between the dUE_DL value reported by the UE and the dNB_UL value based on the actual capability of the eNB. Likewise, when a dNB_DL value based on the actual capability of the eNB and a dUE_UL value reported by the UE are different, dNB_DL and dUE_UL values used in determining final RTT_DL and RTT_UL values (Harq_DL and Harq_UL based on the RTT_DL and RTT_UL values, respectively) may be set equally to the larger between the dNB_DL value based on the actual capability of the eNB and the dUE_UL value reported by the UE.

Meanwhile, different RTT_DL and RTT_UL values may be set in a specific situation (e.g., different TTI lengths are set for DL and UL, (even though the TTI lengths of DL and UL are equal,) different latency requirements are configured for DL and UL, or the UE has different processing capabilities for DL and UE). Harq_DL and Harq_UL values calculated on the basis of the RTT_DL and RTT_UL values may also be calculated to be different. For example, if a shorter TTI length is set for UL than for DL, or a smaller (maximum) required latency is configured for UL than for DL (and/or UL data encoding takes less time than DL data decoding at the UE), RTT_DL>RTT_UL. The numbers of HARQ processes for DL and UL may be determined so that Harq_DL>Harq_UL according to RTT_DL>RTT_UL.

Further, in consideration of the above HARQ timing latencies, different numbers of blind detections (BDs) per TTI may be assigned for a DL control signal for DL data scheduling (e.g., DL grant DCI) and a DL control signal for UL data scheduling (e.g., UL grant DCI). For example, if RTT_DL>RTT_UL or dUE_DL>dUE_UL, a smaller number of BDs may be assigned to the UL grant DCI than the DL grant DCI. On the contrary, if RTT_UL>RTT_DL or dUE_UL>dUE_DL, a smaller number of BDs may be assigned to the DL grant DCI that the UL grant DCI.

Additionally, in consideration of the HARQ timing latencies, different code block (CB) signal mapping schemes may be applied to DL data and UL data. A CB means a block segmented from a TP, for encoding, and a cyclic redundancy check (CRC) may be added to each CB, for an error check. For example, if RTT_DL>RTT_UL or dUE_DL>dUE_UL, time-first mapping (or time-frequency interleaved mapping) may be applied to DL data, and frequency-first mapping may be applied to UL data. On the contrary, if RTT_UL>RTT_DL or dUE_UL>dUE_DL, time-first mapping (or time-frequency interleaved mapping) may be applied to UL data, and frequency-first mapping may be applied to DL data. Or which one between time-first mapping (or time-frequency interleaved mapping) and frequency-first mapping is to be applied to each of DL data and UL data may be configured for the UE semi-statically (e.g., by RRC signaling or the like), or may be indicated to the UE dynamically (e.g., by DL/UL grant DCI or the like).

[Method 3] Different HARQ Timings and Different HARQ Processes are Configured for Different Use Cases or TTI Lengths.

In this method, a different HARQ timing latency (e.g., RTT or the like), a different (maximum) number of HARQ processes, and/or a different FDD SF offset may be configured for each user case or TTI length (or according to the number of symbols per TTI). A different HARQ timing latency or FDD SF offset means, for each use case or TTI length (or according to the number of symbols per TTI), a different HARQ timing latency (e.g., if an HARQ timing latency is set to a×TTI, a different value of a) or a different FDD SF offset (e.g., if an FDD SF offset is set to b×TTI, a different value of b), which is configured as a relative value with respect to a TTI length (or the number of symbols per TTI).

For example, for eMBB or a longer TTI length (or a larger number of OFDM symbols in a single TTI), an HARQ timing latency and the number of HARQ processes increase (only to or below specific values), and an FDD SF offset is not set (i.e., FDD SF offset=zero). On the other hand, for URLLC or a shorter TTI length (or a smaller number of OFDM symbols in a single TTI), the HARQ timing latency and the number of HARQ processes decrease (only to or above specific values), and an FDD SF offset may be set (to a non-zero value).

Further, for use each case or TTI length, a different number of BDs performed for a DL control channel within a single TTI or a different number of DL control channel candidates to be subjected to BD may be assigned in a consideration of an HARQ timing latency. For example, for eMBB or a longer TTI length (or a larger number of OFDM symbols in a single TTI), the number of allocated BDs per TTI increases (only to or below a specific value), whereas for URLLC or a shorter TTI length (or a smaller number of OFDM symbols in a single TTI), the number of allocated BDs per TTI decreases (only to or above a specific value).

Further, for each use case or TTI length (or according to the number of OFDM symbols per TTI), a different CB signal mapping scheme may be applied from the viewpoint of DL/UL data transmission in consideration of an HARQ timing latency. For example, for eMBB or a larger TTI length (or a larger number of OFDM symbols in a single TTI), time-first mapping (or time-frequency interleaved mapping) may be applied to a CB signal on a subcarrier basis, for (time) diversity instead of latency reduction. On the other hand, for URLLC or a shorter TTI length (or a smaller number of OFDM symbols in a single TTI), frequency-first mapping may be applied to a CB signal on a symbol basis, for early decoding-based latency reduction. Or, which one between time-first mapping (or time-frequency interleaved mapping) and frequency-first mapping is to be applied to a CB signal of DL/UL data may be configured for the UE semi-statically (e.g., by RRC signaling or the like), or may be indicated to the UE dynamically (e.g., by DL/UL grant DCI or the like).

In another example, only for a specific use case (e.g., URLLC) (or a TTI length or the number of OFDM symbols per TTI, which is equal to or less than a predetermined value), a different HARQ timing latency, a different number of HARQ processes, and/or a different FDD SF offset may be set according to the TTI length (or the number of OFDM symbols per TTI). Specifically, if the TTI length (or the number of OFDM symbols per TTI) is large, the HARQ timing latency and the number of HARQ processes decrease (only to or above a specific value), and a large FDD SF offset may be set. On the other hand, if the TTI length (or the number of OFDM symbols per TTI) is small, the HARQ timing latency and the number of HARQ processes increase (only to or below a specific value), and a small FDD SF offset may be set.

Further, if the TTI length (or the number of OFDM symbols per TTI) is large, the number of BDs per TTI may be decreased (only to or above a specific value) in order to achieve a small HARQ timing latency, whereas if the TTI length (or the number of OFDM symbols per TTI) is small, the number of BDs per TTI may be increased (only to or below a specific value) because the HARQ timing latency is relatively large. Further, if the TTI length (or the number of OFDM symbols per TTI) is large, frequency-first mapping may be applied to a CB signal of DL/UL data in order to achieve a small HARQ timing latency, whereas if the TTI length (or the number of OFDM symbols per TTI) is small, time-first mapping (or time-frequency interleaved mapping) may be applied to a CB signal of DL/UL data because the HARQ timing latency is relatively large.

Additionally, the UE may report its dUE_DL information and/or dUE_UL information for each use case or TTI length (or SCS) (or for each number of OFDM symbols per TTI) to the eNB. Further, RTT_DL and Harq_DL based on RTT_DL may (automatically) be set to the double of dUE_DL reported by the UE. RTT_UL and Harq_UL based on RTT_UL may also (automatically) be set to the double of dUE_UL reported by the UE. Meanwhile, if the eNB configures one or more dUE_DL candidates (separately from dUE_DL reported by the UE), RTT_DL and Harq_DL based on RTT_DL may (automatically) be set to the double of a specific dUE_DL value (e.g., a minimum dUE_DL value, a maximum dUE_DL value, a median dUE_DL value, or a smallest integer equal to or larger than the average of the candidates, or a largest integer equal to or smaller than the average) among the dUE_DL candidates, or the smaller between the specific dUE_DL value and a specific threshold. Likewise, if the eNB configures one or more dUE_UL candidates (separately from dUE_UL reported by the UE), RTT_UL and Harq_UL based on RTT_UL may (automatically) be set to the double of a specific dUE_UL value (a minimum dUE_UL value, a maximum dUE_UL value, a median dUE_UL value, or a smallest integer equal to or larger than the average of the candidates, or a largest integer equal to or smaller than the average) among the dUE_UL candidates, or the smaller between the specific dUE_UL value and a specific threshold.

[Method 4] an SF Offset is Configured Between a DL Carrier and a UL Carrier in an FDD Situation.

In this method, an SF offset may be set between a DL carrier and a UL carrier, that is, between a DL SF and a UL SF in order to reduce an HARQ latency in an FDD situation (particularly, a URLLC situation). The SF offset may be in the form of (A+B). The SF offset may be applied to, for example, the UL carrier. Herein, A may represent a basic offset term having a value equal or equivalent to an HARQ timing latency (particularly, corresponding to dUE_DL or dUE_UL at the UE). B may represent an additional offset term having a value equal or equivalent to the time interval between a UL SF boundary and the starting time of a UL control channel (carrying an HARQ-ACK) or the starting time of a UL data channel (a time obtained by adding the time interval between a DL SF boundary and the ending time of a DL control channel (carrying a UL grant) thereto). If an SF offset of (A+B) is applied, the time interval between the ending time of a DL data channel (e.g., a DL SF boundary) and the starting time of a UL control channel (e.g., an HARQ-ACK) or the time interval between the ending time of a DL control channel (e.g., a UL grant) and the starting time of a UL data channel (e.g., a UL SF boundary) may eventually be set to be equal to A. A may be set to a value equal to or most approximate to 0.5 SF/TTI.

FIGS. 22 and 23 illustrate exemplary cases of applying an SF offset between a DL SF and a UL SF (from the viewpoint of an eNB). FIG. 22 illustrates a case in which the first symbol of a UL SF is configured as a UL control channel transmission period, and FIG. 23 illustrates a case in which the last symbol of a UL SF is configured as a UL control channel transmission period. Referring to FIGS. 22 and 23, A set to 0.5 SF/TTI (A=0.5 SF/TTI) may be an example in which dUE_DL=dNB_DL (and/or dUE_UL=dNB_UL). If dUE_DL and dNB_UL are set to different values (and/or dUE_UL and dNB_UL are set to different values), A may be set based on dUE_DL (or dUE_UL). Further, an SF offset may be set in consideration of a self-contained transmission operation as illustrated in FIG. 17 (e.g., DL data reception and HARQ-ACK transmission for the DL data reception in an SF/TTI having the same index) so that the starting time of a UL control channel is positioned in UL SF/TTI # n after A from the ending time of a DL data channel in DL SF/TTI # n. Additionally, the direction of the SF offset (e.g., +or −) may be determined to be different according to the position of a UL control channel transmission period (e.g., the first one or more symbols, or the last one or more symbols) in a UL SF. Meanwhile, the SF offset may be used specifically as a TA offset which the UE applies for transmission of a PRACH preamble during random access.

[Method 5] Different TTI Lengths are Configured Between a DL Carrier and a UL Carrier in an FDD Situation.

In this method, a DL TTI configured in a DL carrier and a UL TTI configured in a UL carrier may be set to different lengths. Specifically, the DL TTI may be set to a larger length than the UL TTI. For example, the length of the DL TTI may be set to a multiple (e.g., double) of the length of the UL TTI.

For example, a situation in which a DL TTI is set to a length equal to the duration of a DL SF, and a UL TTI is set to a length equal to ½ of the duration of a UL SF may be assumed. For example, a state in which dUE_DL is considered to be about 0.5 SF (or ½ of a DL TTI or one UL TTI) may be assumed. In this case, in consideration of DL HARQ latency reduction, an HARQ-ACK signal for DL data reception (in SF # n) may be transmitted 1) in the first UL TTI (within SF #(n+1)), if a UL control channel period is configured in the last some OFDM symbols of a UL TTI, and 2) in the second UL TTI (within SF #(n+1)), if the UL control channel period is configured in the first some OFDM symbols of a UL TTI.

Further, one UL data may be scheduled to be transmitted across a plurality of (e.g., 2) UL TTIs in the above situation. (Considering UL HARQ latency reduction in the state where dUE_UL is considered to be about 0.5 SF (or ½ of DL TTI or one UL TTI,) a non-zero SF offset corresponding to, for example, dUE_UL (or dUE_DL) may be set between a DL carrier and a UL carrier. In this case, UL data transmission corresponding to UL grant reception in DL SF # n may be performed in a UL SF (the closest UL SF) configured after the starting time of DL SF # n. Further, an HARQ-ACK signal for DL data reception in DL SF # n may be transmitted (1) in the second TTI of a UL SF (the closest UL SF) after the starting time of DL SF # n, if a UL control channel period is configured in the last some OFDM symbols of a UL TTI, and (2) in the first TTI of a UL SF (the closest UL SF) after the ending time of DL SF # n, if a UL control channel period is configured in the first some OFDM symbols of a UL TTI.

On the contrary, the UL TTI may be set to a larger length than the DL TTI. For example, the length of the UL TTI may be set to a multiple (double) of the length of the DL TTI. Herein, one DL data may be scheduled to be transmitted across a plurality of (e.g., 2) DL TTIs. In this case, an SF offset and a UL grant time point may be determined such that for the same HARQ latency as described above, the time interval between UL grant reception and corresponding UL data transmission and/or the time interval between DL data reception and UL control channel transmission (carrying an HARQ-ACK for the DL data reception) is 0.5 SF (½ of a UL TTI or one DL TTI).

Figure 24:
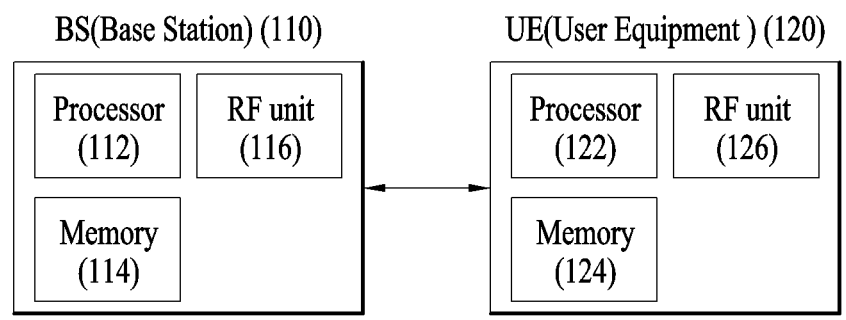
FIG. 24 illustrates a base station and user equipment applicable to an embodiment of the present invention.

FIG. 24 illustrates a BS and a UE of a wireless communication system, which are applicable to embodiments of the present invention.

Referring to FIG. 24, the wireless communication system includes a BS 110 and a UE 120. When the wireless communication system includes a relay, the BS or UE may be replaced by the relay.

The BS 110 includes a processor 112, a memory 114 and a radio frequency (RF) unit 116. The processor 112 may be configured to implement the procedures and/or methods proposed by the present invention. The memory 114 is connected to the processor 112 and stores information related to operations of the processor 112. The RF unit 116 is connected to the processor 112 and transmits and/or receives an RF signal. The UE 120 includes a processor 122, a memory 124 and an RF unit 126. The processor 122 may be configured to implement the procedures and/or methods proposed by the present invention. The memory 124 is connected to the processor 122 and stores information related to operations of the processor 122. The RF unit 126 is connected to the processor 122 and transmits and/or receives an RF signal.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It will be obvious to those skilled in the art that claims that are not explicitly cited in each other in the appended claims may be presented in combination as an embodiment of the present invention or included as a new claim by a subsequent amendment after the application is filed.

In the embodiments of the present invention, a description is made centering on a data transmission and reception relationship among a BS, a relay, and an MS. In some cases, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'BS' may be replaced with the term 'fixed station', 'Node B', 'enhanced Node B (eNode B or eNB)', 'access point', etc. The term 'UE' may be replaced with the term 'Mobile Station (MS)', 'Mobile Subscriber Station (MSS)', 'mobile terminal', etc.

The embodiments of the present invention may be achieved by various means, for example, hardware, firmware, software, or a combination thereof. In a hardware configuration, the methods according to the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be implemented in the form of a module, a procedure, a function, etc. For example, software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The present invention is applicable to UEs, eNBs or other apparatuses of a wireless mobile communication system.

The invention claimed is:

1. A method of receiving a downlink signal by a terminal in a wireless communication system, the method comprising:
  receiving data in an allocated time-frequency resource during a first transmission time interval (TTI), wherein the allocated time-frequency resource includes resource elements (REs) corresponding to (i) a plurality of orthogonal frequency division multiplexing (OFDM) symbols in time and (ii) a plurality of subcarriers in frequency; and
  transmitting acknowledgement/negative acknowledgement (ACK/NACK) information for the data,
  wherein based on a TTI length related to the first TTI being equal to or larger than a reference value, the data is placed on the allocated time-frequency resource in a way that the data is first placed on REs of a same subcarrier, and then REs of a next subcarrier, and
  wherein based on the TTI length being less than the reference value, the data is placed on the allocated time-frequency resource in a way that the data is first placed on REs of a same OFDM symbol, and then REs of a next OFDM symbol.

2. The method according to claim 1, further comprising: receiving a retransmission signal of the data during a second TTI,
  wherein a time interval between the first TTI and the second TTI is changed according to the TTI length, and
  wherein as the TTI length increases, the time interval between the first TTI and the second TTI increases, and as the TTI length decreases, the time interval between the first TTI and the second TTI decreases.

3. The method according to claim 1, further comprising blind-decoding a plurality of control channel candidates to receive a control channel scheduling the data during the first TTI,
  wherein the number of blind decodings during the first TTI is changed according to the TTI length.

4. The method according to claim 3, wherein as the TTI length increases, the number of blind decodings during the first TTI increases, and as the TTI length decreases, the number of blind decodings during the first TTI decreases.

5. The method according to claim 1, wherein the TTI length is set according to a service type provided to the terminal in the order of ultra-reliable and low latency communications (URLLC)<enhanced mobile broadband (eMBB)<massive machine type communications (mMTC).

6. The method according to claim 1, wherein the wireless communication system includes a 3rd generation partnership project long term evolution (3GPP LTE)-based wireless communication system, and the TTI length is an integer multiple of a subframe or a slot.

7. A terminal configured to operate in a wireless communication system, the terminal comprising:
  a radio frequency (RF) module;
  at least one processor; and
  at least one computer memory operably connectable to the at least one processor and storing instructions that, based on being executed by the at least one processor, perform operations comprising;
  receiving, through the RF module, data in an allocated time-frequency resource during a first transmission time interval (TTI), wherein the allocated time-frequency resource includes resource elements (REs) corresponding to (i) a plurality of orthogonal frequency division multiplexing (OFDM) symbols in time and (ii) a plurality of subcarriers in frequency; and
  transmitting, through the RF module, acknowledgement/negative acknowledgement (ACK/NACK) information for the data,
  wherein based on a TTI length related to the first TTI being equal to or larger than a reference value, the data is placed on the allocated time-frequency resource in a way that the data is first placed on REs of a same subcarrier, and then REs of a next subcarrier, and
  wherein based on the TTI length being less than the reference value, the data is placed on the allocated time-frequency resource in a way that the data is first placed on REs of a same OFDM symbol, and then REs of a next OFDM symbol.

8. The terminal according to claim 7, wherein the operations further comprise:
  receiving a retransmission signal of the data during a second TTI,
  wherein a time interval between the first TTI and the second TTI is changed according to the TTI length, and
  wherein as the TTI length increases, the time interval between the first TTI and the second TTI increases, and as the TTI length decreases, the time interval between the first TTI and the second TTI decreases.

9. The terminal according to claim 7, wherein the operations further comprise:
  blind-decoding a plurality of control channel candidates to receive a control channel scheduling the data during the first TTI,
  wherein the number of blind decodings during the first TTI is changed according to the TTI length.

10. The terminal according to claim 9, wherein as the TTI length increases, the number of blind decodings during the first TTI increases, and as the TTI length decreases, the number of blind decodings during the first TTI decreases.

11. The terminal according to claim 7, wherein the TTI length is set according to a service type provided to the terminal in the order of ultra-reliable and low latency communications (URLLC)<enhanced mobile broadband (eMBB)<massive machine type communications (mMTC).

12. The terminal according to claim 7, wherein the wireless communication system includes a 3$^{rd}$ generation partnership project long term evolution (3GPP LTE)-based wireless communication system, and the TTI length is an integer multiple of a subframe or a slot.

13. A processing apparatus configured to control a terminal to operate in a wireless communication system, the processing apparatus comprising:
  at least one processor; and
  at least one computer memory operably connectable to the at least one processor and storing instructions that, based on being executed by the at least one processor, perform operations comprising:
  receiving data in an allocated time-frequency resource during a first transmission time interval (TTI), wherein the allocated time-frequency resource includes resource elements (REs) corresponding to (i) a plurality of orthogonal frequency division multiplexing (OFDM) symbols in time and (ii) a plurality of subcarriers in frequency; and
  transmitting acknowledgement/negative acknowledgement (ACK/NACK) information for the data,
  wherein based on a TTI length related to the first TTI being equal to or larger than a reference value, the data is placed on the allocated time-frequency resource in a way that the data is first placed on REs of a same subcarrier, and then REs of a next subcarrier, and
  wherein based on the TTI length being less than the reference value, the data is placed on the allocated time-frequency resource in a way that the data is first placed on REs of a same OFDM symbol, and then REs of a next OFDM symbol.

14. The processing apparatus according to claim 13, wherein the operations further comprise:
  receiving a retransmission signal of the data during a second TTI,
  wherein a time interval between the first TTI and the second TTI is changed according to the TTI length, and
  wherein as the TTI length increases, the time interval between the first TTI and the second TTI increases, and as the TTI length decreases, the time interval between the first TTI and the second TTI decreases.

15. The processing apparatus according to claim 13, wherein the operations further comprise:
  blind-decoding a plurality of control channel candidates to receive a control channel scheduling the data during the first TTI,
  wherein the number of blind decodings during the first TTI is changed according to the TTI length.

16. The processing apparatus according to claim 15, wherein as the TTI length increases, the number of blind decodings during the first TTI increases, and as the TTI length decreases, the number of blind decodings during the first TTI decreases.

* * * * *